(12) United States Patent
Funakoshi

(10) Patent No.: US 10,235,010 B2
(45) Date of Patent: Mar. 19, 2019

(54) INFORMATION PROCESSING APPARATUS CONFIGURED TO GENERATE AN AUDIO SIGNAL CORRESPONDING TO A VIRTUAL VIEWPOINT IMAGE, INFORMATION PROCESSING SYSTEM, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Masanobu Funakoshi, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/643,798

(22) Filed: Jul. 7, 2017

(65) Prior Publication Data
US 2018/0035235 A1    Feb. 1, 2018

(30) Foreign Application Priority Data

Jul. 28, 2016  (JP) .................... 2016-148995
Jul. 28, 2016  (JP) .................... 2016-148996

(51) Int. Cl.
*G06T 7/70* (2017.01)
*H04S 3/00* (2006.01)
(Continued)

(52) U.S. Cl.
CPC .......... *G06F 3/04815* (2013.01); *G06T 7/70* (2017.01); *H04S 3/008* (2013.01); *H04S 7/30* (2013.01);
(Continued)

(58) Field of Classification Search
CPC .............. G06F 3/0484; G06F 3/04842; G06F 3/04815; G06T 7/70; H04S 3/008;
(Continued)

(56) References Cited

U.S. PATENT DOCUMENTS 5,714,997 A * 2/1998 Anderson ............ G02B 27/017
                                                        348/36
8,694,553 B2 * 4/2014 Shuster ............... G06F 3/04815
                                                        715/200
(Continued)

FOREIGN PATENT DOCUMENTS

JP    2005223771 A    8/2005
WO    9621321 A1      7/1996
WO    2010022658 A1   3/2010

OTHER PUBLICATIONS

Extended European Search Report issued in European Appln. No. 17183371.8 dated Nov. 29, 2017.
(Continued)

*Primary Examiner* — Jesse A Elbin
(74) *Attorney, Agent, or Firm* — Rossi, Kimms & McDowell LLP

(57) ABSTRACT

An information processing apparatus acquires information about designation of a position of a virtual viewpoint related to a virtual viewpoint image generated based on image capturing by a plurality of cameras, and decides, based on the information, a virtual listening point for generating an audio signal based on sound pickup at a plurality of sound pickup points.

20 Claims, 14 Drawing Sheets

(51) Int. Cl.
*H04S 7/00* (2006.01)
*H04R 27/00* (2006.01)
*G06F 3/0481* (2013.01)

(52) U.S. Cl.
CPC .............. *H04S 7/303* (2013.01); *H04S 7/304* (2013.01); *A63F 2300/8082* (2013.01); *H04R 27/00* (2013.01); *H04S 2400/07* (2013.01); *H04S 2400/11* (2013.01); *H04S 2400/15* (2013.01); *H04S 2420/01* (2013.01)

(58) Field of Classification Search
CPC ............ H04S 7/30; H04S 7/303; H04S 7/304; H04S 7/40; H04S 2400/11; H04S 2400/15; H04S 2420/01; A63F 2300/8082; G11B 19/025
USPC .................... 700/94; 381/17–23; 715/727
See application file for complete search history.

(56) References Cited

U.S. PATENT DOCUMENTS

| | | | |
|---|---|---|---|
| 9,892,558 B2* | 2/2018 | Troy | ................ G06T 7/70 |
| 2011/0157327 A1 | 6/2011 | Seshadri et al. | |
| 2014/0314391 A1* | 10/2014 | Kim | ............... G06F 3/04842 |
| | | | 715/716 |
| 2015/0057779 A1* | 2/2015 | Saungsomboon | ........ H04S 7/30 |
| | | | 700/94 |
| 2015/0221334 A1 | 8/2015 | King et al. | |
| 2016/0212562 A1 | 7/2016 | Ojanperä | |

OTHER PUBLICATIONS

Office Action issued in Japanese Appln. No. 2016-148995 dated Jul. 2, 2018.

Horiuchi et al. "Interactive Music Video Application for Smartphones Based on Free-viewpoint Video and Audio Rendering." ITE Annual Convention. 2012: 2-3. English Abstract provided.

Fukushima et al. "Free Viewpoint and Listening-Point Video Generation by Using Multi Viewpoint and Multi Listening-Point Data Capturing System." Journal Article of the IEICE. 2008: 2039-2041. vol. J91-D No. 8.

Mawatari et al. "A Virtual Microphone for Acquisition of Sound Annotations in Augmented Reality." Proceedings of IEICE general conference. 2004: 346.

* cited by examiner

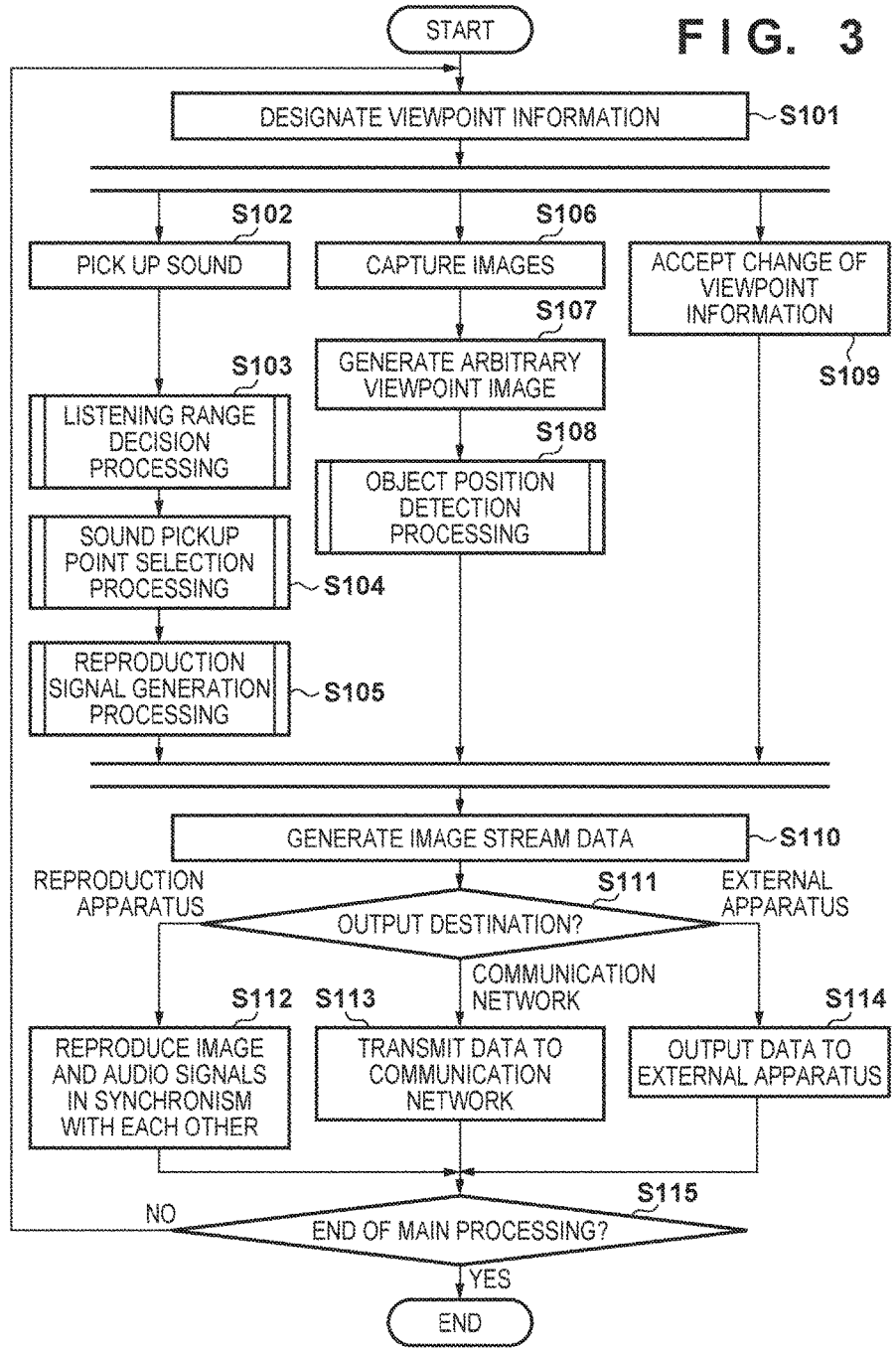

FIG. 4A

| VIEWPOINT POSITION |
| --- |
| VIEWPOINT DEPRESSION ANGLE |
| VIEWPOINT DIRECTION |
| ANGLE OF VIEW |

FIG. 4B

| SOUND PICKUP POINT ID |
| --- |
| SOUND PICKUP POINT COORDINATES |
| SOUND PICKUP SIGNAL |

FIG. 4C

| CAMERA POSITION |
| --- |
| CAMERA DEPRESSION ANGLE |
| CAMERA DIRECTION |
| ANGLE OF VIEW |
| FOCAL LENGTH |
| IMAGE SIGNAL |

FIG. 4D

| LISTENING RANGE |
| --- |
| LISTENING POINT |
| LISTENING DIRECTION |

FIG. 4E

| SOUND PICKUP POINT ID |
| --- |
| CORRESPONDING SOUND SOURCE ARRANGEMENT DIRECTION ID |
| DIRECTION WHEN VIEWED FROM LISTENING POINT |

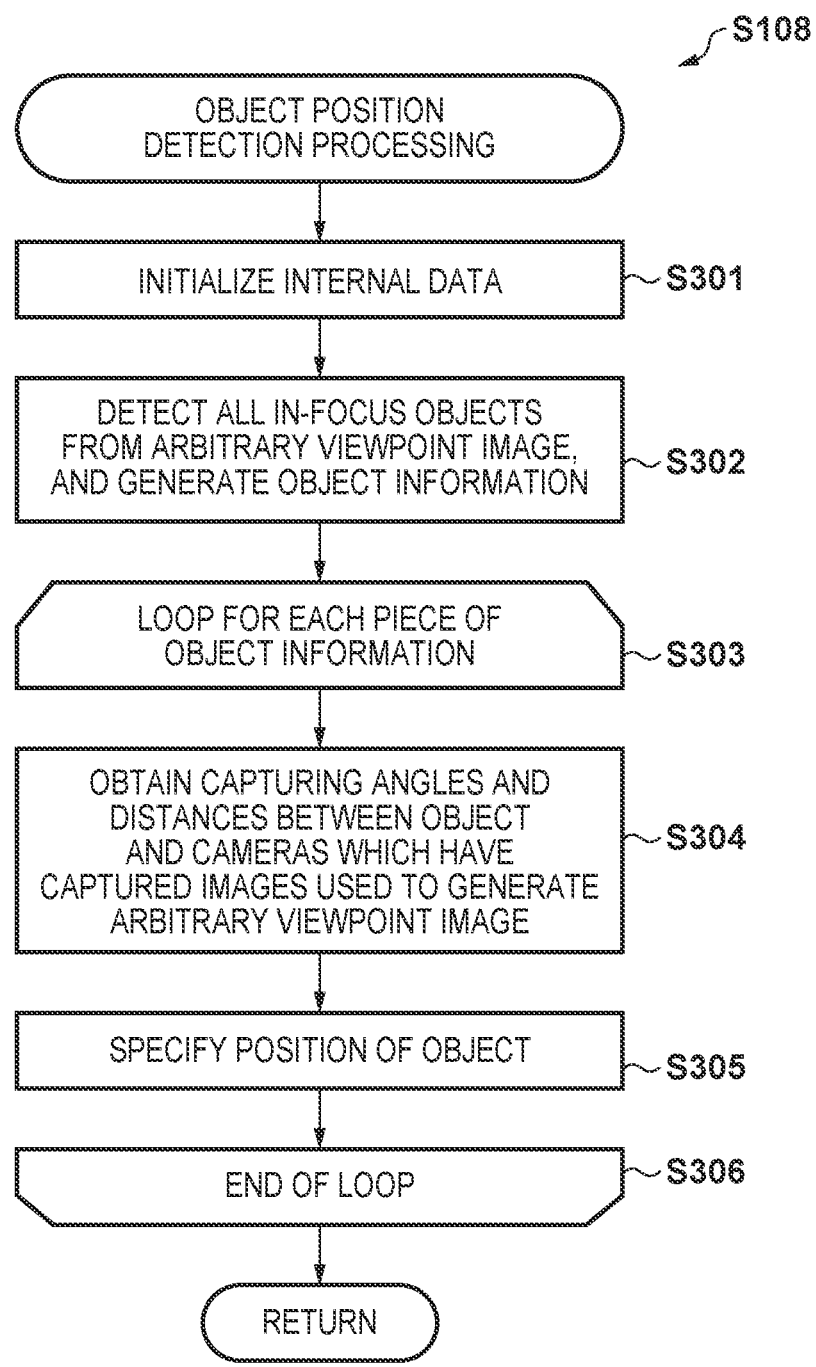

INFORMATION PROCESSING APPARATUS CONFIGURED TO GENERATE AN AUDIO SIGNAL CORRESPONDING TO A VIRTUAL VIEWPOINT IMAGE, INFORMATION PROCESSING SYSTEM, INFORMATION PROCESSING METHOD, AND NON-TRANSITORY COMPUTER-READABLE STORAGE MEDIUM

BACKGROUND OF THE INVENTION

Field of the Invention

The present invention relates to an information processing apparatus, an information processing system, an information processing method, and a non-transitory computer-readable storage medium and, more particularly, to a technique of generating an audio reproduction signal suitable for an arbitrary viewpoint image.

Description of the Related Art

In recent years, a system of generating an image of an arbitrary viewpoint by appropriately processing images captured by a plurality of cameras installed to surround a wide range such as a sports stadium has been developed by applying a computer graphics technique and the like.

To add realism to an arbitrary viewpoint image generated by such system, it is required to generate and reproduce an audio signal corresponding to the image.

To achieve this, there is known an arrangement of designating an arbitrary position in a stadium or the like, and generating an audio signal suitable for the position (Japanese Patent Laid-Open No. 2005-223771). In this arrangement, an arbitrary viewing point and viewing angle are input in addition to the directivities and locations of a plurality of microphones installed in the stadium, and the signal distribution ratio of each channel and the influence of the distance between each microphone and the viewing point are automatically calculated, thereby automatically mixing surround sounds.

In the arrangement described in Japanese Patent Laid-Open No. 2005-223771, even if any position in a stadium is designated as a listening point, a surround signal is generated using all microphone signals. This imposes a problem that even if the listening point moves, the sound field feeling hardly changes.

In the above-described arrangement, a listening range, a listening point, and a listening direction cannot be automatically changed in accordance with a change in viewpoint. It is thus difficult to represent the change of the sound field suitable for the movement of the viewpoint.

For example, in the above-described arrangement, the user directly designates a listening point and listening direction. Thus, the user does not always designate a listening point and listening direction suitable for an arbitrary viewpoint image.

The present invention provides a technique of solving the above problems.

SUMMARY OF THE INVENTION

According to an aspect of the present invention, an information processing apparatus acquires information about designation of a position of a virtual viewpoint related to a virtual viewpoint image generated based on image capturing by a plurality of cameras, and decides, based on the information, a virtual listening point for generating an audio signal based on sound pickup at a plurality of sound pickup points.

Further features of the present invention will become apparent from the following description of exemplary embodiments (with reference to the attached drawings).

BRIEF DESCRIPTION OF THE DRAWINGS

FIG. 3 is a flowchart illustrating the processing procedure of main processing;

FIGS. 4A to 4E are views showing data structures of pieces of information used in the arbitrary viewpoint image generation system;

FIG. 7 is a flowchart illustrating the processing procedure of object position detection processing;

DESCRIPTION OF THE EMBODIMENTS

First Embodiment (Arbitrary Viewpoint Image Generation System)

Figure 1:
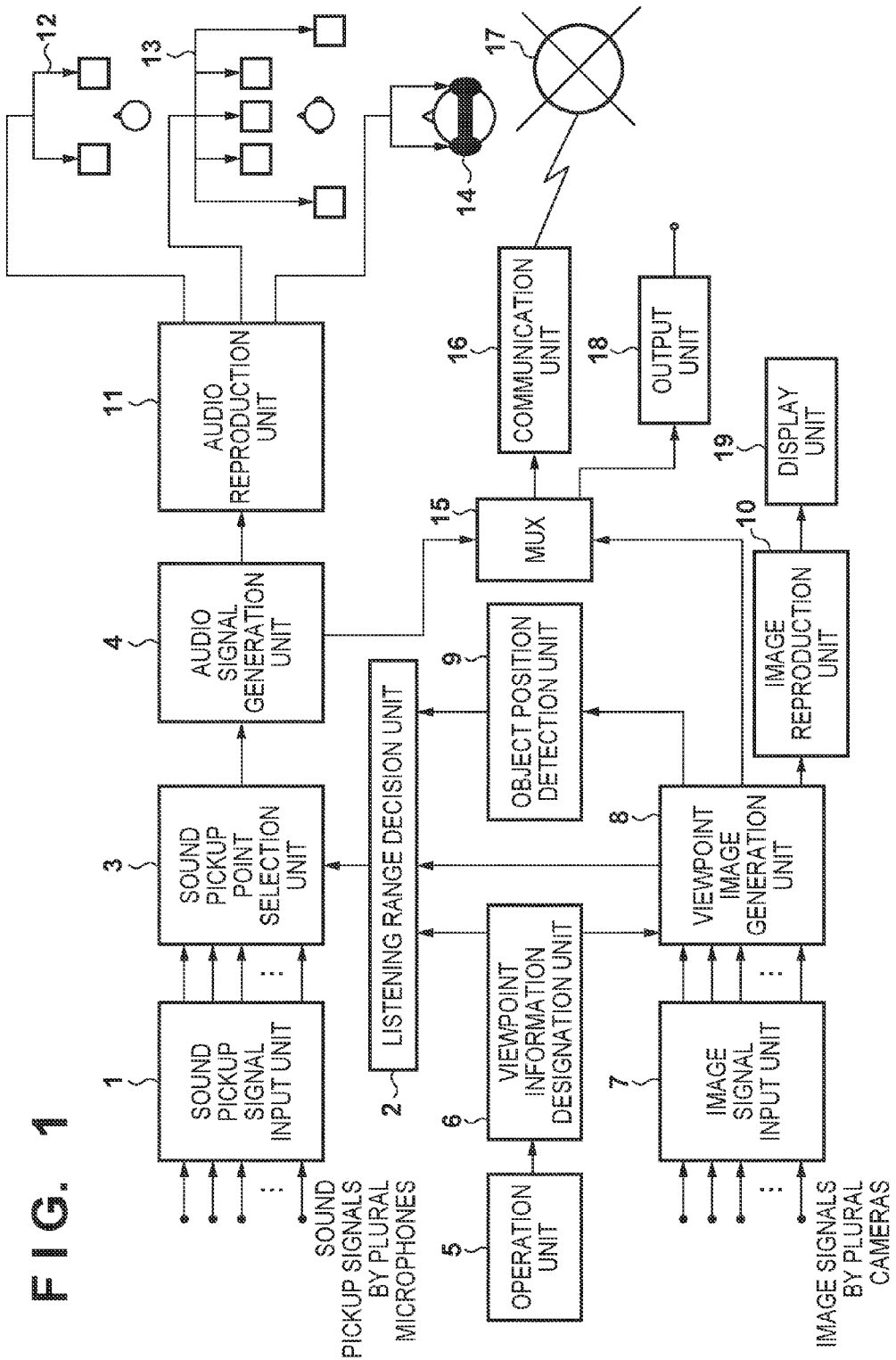
FIG. 1 is a block diagram showing an example of the configuration of an arbitrary viewpoint image generation system.

An arbitrary viewpoint image generation system according to the embodiment of the present invention will be described with reference to FIG. 1. FIG. 1 is a block diagram showing an example of the configuration of the arbitrary viewpoint image generation system according to this embodiment. The arbitrary viewpoint image generation system according to this embodiment operates as an information processing system for outputting an image and audio corresponding to an arbitrarily designated virtual viewpoint (arbitrary viewpoint) based on a plurality of image signals captured by a plurality of image capturing apparatuses (cameras) and a plurality of sound pickup signals picked up at a plurality of sound pickup points.

Referring to FIG. 1, reference numeral 1 denotes a sound pickup signal input unit which inputs sound pickup signals obtained by a plurality of microphones installed at sound pickup points dispersedly set over a stadium as the capturing target of this system and, for example, amplifies the sound pickup signals and removes noise. Furthermore, the sound pickup signal input unit 1 adds additional information indicating the feature of the sound pickup point to each sound pickup signal, and outputs the signal as sound pickup point information to a sound pickup point selection unit 3.

Figure 2:
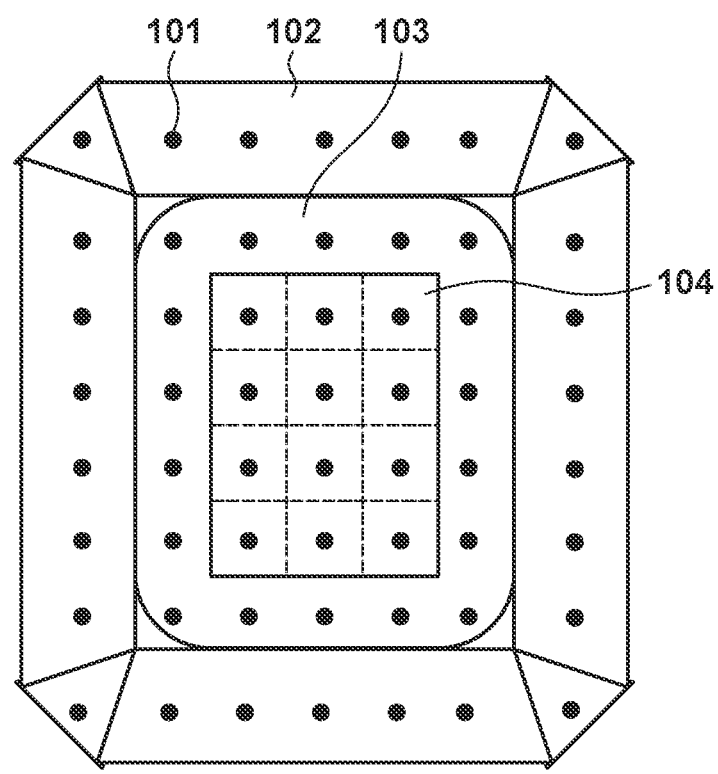
FIG. 2 is a schematic view showing the arrangement status of sound pickup points in a stadium.

FIG. 2 is a view schematically showing an example of setting of sound pickup points in the stadium as the capturing target. Referring to FIG. 2, reference numeral 101 denotes one of sound pickup points; 102, stands; 103, a track; and 104, a ground. This embodiment will explain an example in which the sound pickup points are set at all locations in the stadium and sounds at the sound pickup points are picked up all the time, as shown in FIG. 2.

Reference numeral 2 denotes a listening range decision unit which decides a virtual listening range, a virtual listening point, and a virtual listening direction based on viewpoint information designated by a viewpoint information designation unit 6, an arbitrary viewpoint image (virtual viewpoint image) output from a viewpoint image generation unit 8, and an object position output from an object position detection unit 9. In accordance with the listening range, listening point, and listening direction output from the listening range decision unit 2, the sound pickup point selection unit 3 appropriately selects, from the pieces of sound pickup point information output from the sound pickup signal input unit, sound pickup points to be used to generate an audio reproduction signal. Reference numeral 4 denotes an audio signal generation unit which generates, based on the sound pickup signals at the plurality of sound pickup points selected by the sound pickup point selection unit 3, audio for generating a reproduction audio signal of an arbitrary reproduction format. The audio signal generated by the audio signal generation unit 4 is an audio signal corresponding to the listening point decided by the listening range decision unit 2. That is, the audio signal generation unit 4 generates an audio signal by combining, based on the decided listening point, the plurality of sound pickup signals based on sound pickup at the selected sound pickup points. The audio signal generation unit 4 then outputs the audio signal to an audio reproduction unit 11 and a MUX (multiplexer) 15.

Reference numeral 5 denotes an operation unit which accepts each operation instruction of a user for this system. The viewpoint information designation unit 6 generates viewpoint information based on the operation instruction of the user transmitted via the operation unit 5, and outputs the generated viewpoint information to the listening range decision unit 2 and the viewpoint image generation unit 8. The operation unit 5 is implemented by a keyboard, a pointing device such as a mouse, a touch panel, and the like. As described above, in this embodiment, the arbitrary viewpoint image generation system acquires viewpoint information via the viewpoint information designation unit 6. The image generation system then generates an arbitrary viewpoint image corresponding to a viewpoint specified based on the viewpoint information. That is, the viewpoint information is information about designation of the position of the virtual viewpoint.

Reference numeral 7 denotes an image signal input unit which inputs image signals captured by a plurality of cameras installed in the stadium as the capturing target of this system and, for example, amplifies the image signals and removes noise. Furthermore, the image signal input unit 7 adds camera parameters at the time of capturing to each image signal, and outputs the signal as camera capturing information to the viewpoint image generation unit 8. Note that this embodiment will explain an example when a moving image is generated as an arbitrary viewpoint image. However, a still image may be targeted.

The viewpoint image generation unit 8 generates an arbitrary viewpoint image by appropriately processing images captured by the plurality of cameras in accordance with the viewpoint information designated by the viewpoint information designation unit 6, and outputs the generated image to the listening range decision unit 2, the object position detection unit 9, an image reproduction unit 10, and the MUX 15. The object position detection unit 9 detects the position of an object in the arbitrary viewpoint image based on the viewpoint information and the arbitrary viewpoint image generated by the viewpoint image generation unit 8. As will be described later, examples of the object are a person and a specific substance other than a person. The image reproduction unit 10 reproduces the arbitrary viewpoint image generated by the viewpoint image generation unit 8, and outputs the reproduced image to a display unit 19.

The audio reproduction unit 11 reproduces the audio signal generated by the audio signal generation unit 4 in accordance with a reproduction environment. Reference numeral 12 denotes a stereo speaker set which appropriately amplifies a stereo audio signal generated by the audio signal generation unit 4, converts the signal into a sound, and outputs the sound; 13, a surround speaker set which appropriately amplifies a surround audio signal generated by the audio signal generation unit 4, converts the signal into a sound, and outputs the sound; and 14, headphones which convert headphone signals generated by the audio signal generation unit 4 into sounds and output the sounds. This embodiment will describe an example in which one of the stereo speaker set 12, the surround speaker set 13, and the headphones 14 outputs the sound of the audio signal. However, the sound reproduction environment is not limited to those exemplified here.

The MUX 15 creates one image stream data by superimposing the arbitrary viewpoint image signal generated by the viewpoint image generation unit 8 and the audio signal generated by the audio signal generation unit 4, and outputs the created data to a communication unit 16 and an output unit 18. The communication unit 16 appropriately transmits, to a communication network 17, the image stream data output from the MUX 15. The communication network 17 represents a public communication network such as the Internet or a public switched telephone network. The output unit 18 includes an output terminal, and outputs, to an external apparatus connected to the output terminal, the image stream data output from the MUX 15. The display unit 19 displays the arbitrary viewpoint image reproduced by the image reproduction unit 10. The display unit 19 is implemented by a liquid crystal panel, an organic EL display, or the like.

These components are connected to a CPU (Central Processing Unit) (not shown) via a control bus, and their operations are comprehensively controlled in accordance with a command instruction from the CPU. The CPU reads out a computer program from a storage device (not shown), and controls the overall apparatus in accordance with the computer program.

Note that in this embodiment, the information processing apparatus including the sound pickup signal input unit 1, the listening range decision unit 2, the sound pickup point selection unit 3, the audio signal generation unit 4, the viewpoint information designation unit 6, the image signal input unit 7, the viewpoint image generation unit 8, the object position detection unit 9, and the MUX 15 is included in the arbitrary viewpoint image generation system, and the remaining components are included in an apparatus different from the above-described information processing apparatus. However, the arrangement of the information processing apparatus is not limited to this. For example, the above-described information processing apparatus may further include the audio reproduction unit 11, the image reproduction unit 10, the communication unit 16, and the output unit 18. Furthermore, for example, the first information processing apparatus included in the arbitrary viewpoint image generation system may include the sound pickup signal input unit 1, the listening range decision unit 2, the sound pickup point selection unit 3, and the audio signal generation unit 4. The second information processing apparatus may include the viewpoint information designation unit 6, the image signal input unit 7, the viewpoint image generation unit 8, and the object position detection unit 9.

(Main Processing)

Processing of deciding a listening range, a listening point, and a listening direction in accordance with viewpoint information, and generating a sound field based on them in the arrangement of this embodiment shown in FIG. 1 will be described below with reference to flowcharts. FIG. 3 is a flowchart illustrating the processing procedure of main processing according to this embodiment. The following steps are executed under the control of the CPU.

In step S101, the viewpoint information designation unit 6 changes viewpoint information in accordance with a command temporarily accumulated in an internal change command buffer, and outputs the information to the listening range decision unit 2 and the viewpoint image generation unit 8.

FIG. 4A shows the data structure of the viewpoint information according to this embodiment. As shown in FIG. 4A, the viewpoint information according to this embodiment includes a viewpoint position, a viewpoint depression angle (viewpoint elevation angle), a viewpoint direction, and an angle of view. Among them, the viewpoint position has three-dimensional coordinates indicating the position of the viewpoint in the stadium as the capturing target. As an example, this embodiment will describe a case wherein a three-dimensional coordinate system in which the X-axis runs east to west, the Y-axis runs south to north, and the Z-axis is defined vertically upward is set and the southwest corner of the overall stadium is set as an origin. The viewpoint depression angle indicates a depression angle at which the viewpoint faces, and is designated within the range of ±90° when the horizontal direction is set as 0°. If the viewpoint depression angle has a negative value, this indicates that the line-of-sight direction is downward with respect to the horizontal direction. The viewpoint direction indicates the direction of a horizontal plane in which the viewpoint faces. In this embodiment, by setting, as a reference front direction, the absolute direction obtained by setting the due north as 0° (that is, the positive direction of the Y-axis), the right-handed (clockwise) direction indicates the positive direction and the left-handed (counterclockwise) direction indicates the negative direction. The angle of view is a value which represents, by an angle, the height and width (field of view) of the arbitrary viewpoint image when viewed from the viewpoint. The three-dimensional direction of a line of sight observed from the viewpoint will be referred to as a line-of-sight direction hereinafter. The line-of-sight direction corresponds to a combination of the viewpoint depression angle and the viewpoint direction. The system of this embodiment can generate an image when viewed from an arbitrary viewpoint designated by this information.

After the processing in step S101 ends, the procedure of processing of generating an audio signal in steps S102 to S105, the procedure of processing of generating an image in steps S106 to S108, and processing in step S109 are parallelly executed. These processing procedures will be described below.

In step S102, audio at the sound pickup points is acquired, and the sound pickup signal input unit 1, for example, amplifies the sound pickup signals of the plurality of microphones, and removes noise. Furthermore, the sound pickup signal input unit 1 adds header information indicating the feature of the sound pickup point to each sound pickup signal, and outputs the signal as sound pickup point information to the sound pickup point selection unit 3. FIG. 4B shows the data structure of the sound pickup point information according to this embodiment. As shown in FIG. 4B, the sound pickup point information according to this embodiment includes a sound pickup point ID, sound pickup point coordinates, and a sound pickup signal. Among them, the sound pickup point ID is a number (identification information) for identifying a sound pickup point. The sound pickup point coordinates are coordinates representing the position of the sound pickup point, and indicate horizontal plane coordinates in the stadium in this embodiment. The sound pickup signal is an audio signal picked up by the microphone installed at this sound pickup point.

In step S103, the listening range decision unit 2 decides a listening range, a listening position, and a listening direction based on the viewpoint information transmitted from the viewpoint information designation unit 6 in step S101. Details of this processing (listening range decision processing) will be described later with reference to FIGS. 5, 6A, and 6B. In step S104, the sound pickup point selection unit 3 selects sound pickup points at which sound pickup signals to be used to generate an audio signal corresponding to an arbitrary viewpoint image are picked up. Details of this processing (sound pickup point selection processing) will be described later with reference to FIGS. 8 and 9. In step S105, the audio signal generation unit 4 generates an audio signal in accordance with each audio reproduction environment. Details of this processing (reproduction signal generation processing) will be described later with reference to FIGS. 10, 11, 12, and 13. The generated audio signal is output to the audio reproduction unit 11 and the MUX 15. After the processing ends, the process advances to step S110.

On the other hand, in step S106, image signals captured by the plurality of cameras are acquired, and the image signal input unit 7 performs noise removal, luminance adjustment, and the like of the image signals. Furthermore, the capturing parameters of each camera are added to the image signal as header information, and the signal is output to the sound pickup point selection unit 3 as camera capturing information. FIG. 4C shows the data structure of the camera capturing information according to this embodiment. As shown in FIG. 4C, the camera capturing information according to this embodiment includes a camera position, a camera depression angle, a camera direction, an angle of view, a focal length, and an image signal. Among them, the camera position has three-dimensional coordinates representing the position of the camera in the stadium as the capturing target. The camera depression angle indicates a depression angle at which the viewpoint faces, and is designated within the range of ±90° when the horizontal direction is set as 0°. The camera direction indicates the direction of a horizontal plane in which the camera faces. In this embodiment, by setting, as a reference front direction, the absolute direction obtained by setting the due north (that is, the positive direction of the Y-axis) as 0°, the right-handed (clockwise) direction indicates the positive direction and the left-handed (counterclockwise) direction indicates the negative direction. The angle of view is a value which represents the width of the captured image by an angle. The focal length is a value which represents the distance from the optical center of a camera lens to an imaging plane. The image signal is the signal of the image itself captured by the camera.

In step S107, the viewpoint image generation unit 8 appropriately processes, based on the viewpoint information transmitted from the viewpoint information designation unit 6 in step S101, the plurality of camera images received in step S106, and combines them, thereby generating an arbitrary viewpoint image. That is, based on the plurality of image signals, the viewpoint image generation unit 8 performs image generation processing of generating an image in accordance with the viewpoint position and line-of-sight direction. Such method of combining a plurality of camera images to obtain an arbitrary viewpoint image is known, and is generally adopted in this field, and a detailed description thereof will be omitted.

In step S108, the object position detection unit 9 detects a position in the stadium, at which an object included in the arbitrary viewpoint image actually exists, by analyzing the captured images of the plurality of cameras received in step S106 and the arbitrary viewpoint image generated in step S107. Details of this processing (object position detection processing) will be described later with reference to FIG. 7. After the processing ends, the process advances to step S110.

In step S109, the viewpoint information designation unit 6 accepts a viewpoint change instruction input by the user via the operation unit 5, converts the instruction into a viewpoint information change command, and primarily accumulates the command in the internal change command buffer. After the processing ends, the process advances to step S110.

In step S110, the MUX 15 superimposes/combines the audio reproduction signal generated in step S105 and the arbitrary viewpoint image signal generated in step S107 to obtain one image stream data, and outputs the data to the communication unit 16 and the output unit 18. After the processing ends, the process advances to step S111.

In step S111, the CPU (not shown) determines the output destination of the system according to this embodiment. If the output destination is a reproduction apparatus, the process advances to step S112. If the output destination is the communication network, the process advances to step S113. If the output designation is an external apparatus, the process advances to step S114.

In step S112, the audio reproduction unit 11 and the image reproduction unit 10 respectively output the audio reproduction signal generated in step S105 and the arbitrary viewpoint image signal generated in step S107 to the audio reproduction environment and the display unit 19 in synchronism with each other. This processing is generally performed in a general image output apparatus, and is known, and a detailed description thereof will be omitted. This processing reproduces the arbitrary viewpoint image and the audio signal corresponding to it in synchronism with each other, thereby improving realism at the time of image reproduction. After the processing ends, the process advances to step S115.

In step S113, the communication unit 16 externally transmits, via the communication network 17, the image stream data created in step S110. After the processing ends, the process advances to step S115.

In step S114, the output unit 18 outputs the image stream data created in step S110 to the external apparatus connected to the external output terminal. After the processing ends, the process advances to step S115.

In step S115, the CPU (not shown) determines whether to end the main processing currently performed in this overall flowchart. If it is determined to end the processing (YES in step S115), the process of this flowchart ends; otherwise (NO in step S115), the process returns to step S101.

(Listening Range Decision Processing)

Figure 5:
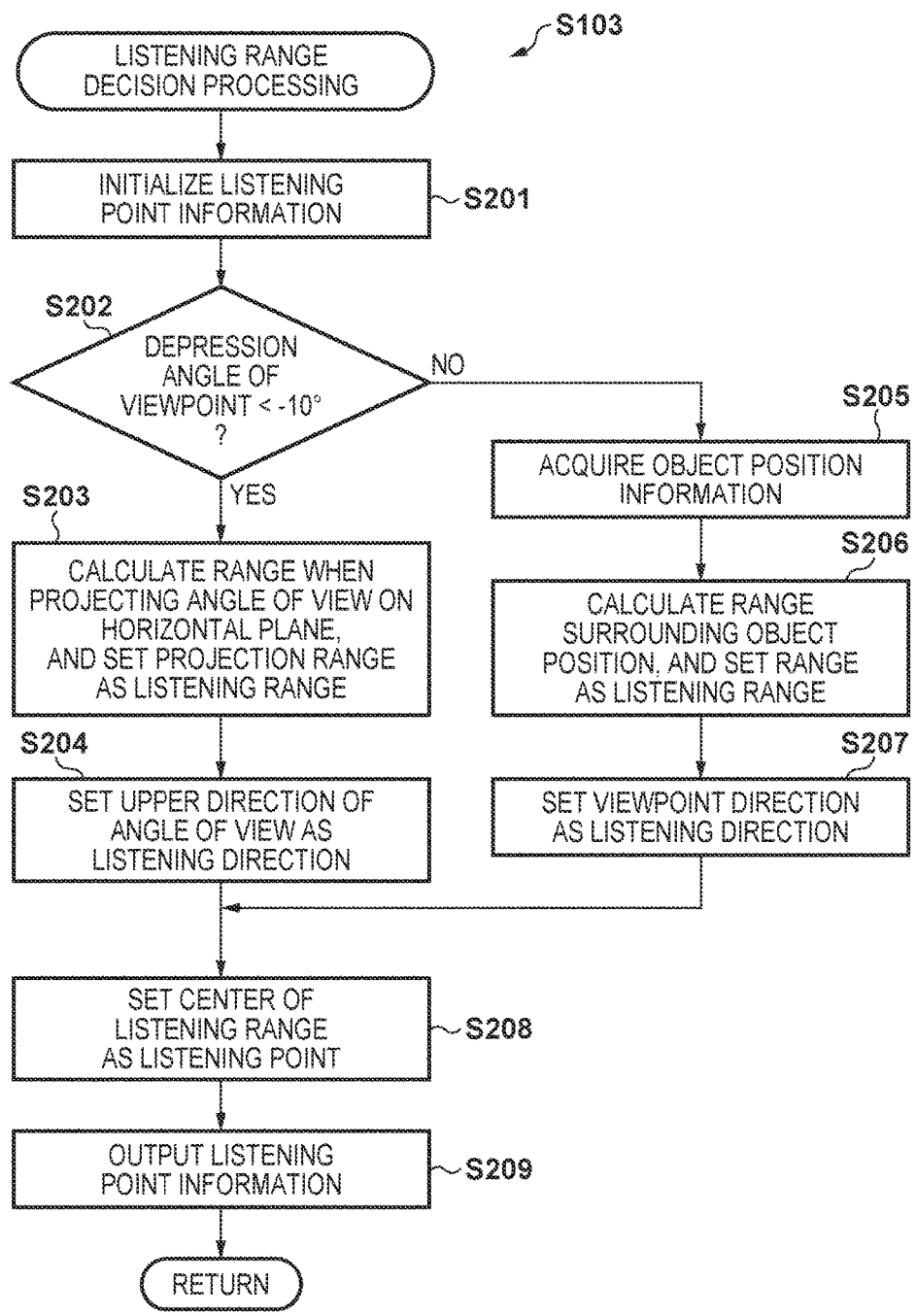
FIG. 5 is a flowchart illustrating the processing procedure of listening range decision processing.

FIG. 5 is a flowchart illustrating the detailed processing procedure of the listening range decision processing in step S103 according to this embodiment. Note that the listening range decision unit 2 performs all processes in this flowchart.

In step S201, listening point information stored in the internal RAM (not shown) of the listening range decision unit 2 is initialized. FIG. 4D shows the data structure of the listening point information. The listening point information according to this embodiment includes a listening range, a listening point, and a listening direction. Among them, the listening range is data indicating a range, in the stadium as the capturing target, within which a sound assumed to be heard nearby as if the user existed in the arbitrary viewpoint image is generated. In this embodiment, the coordinates of four points on the horizontal plane are stored, and a rectangular range formed by connecting the points is set as a listening range. As will be described later, the listening range functions as a location range serving as a reference for selecting sound pickup points of sound pickup signals to be used to generate an audio signal. In addition, the listening point is a point serving as a reference for arranging the sound pickup signals when generating a reproduction signal in the subsequent processing, and stores coordinates on the horizontal plane. Similarly, the listening direction is a direction serving as a reference for arranging the sound pickup signals when generating a reproduction signal in the subsequent processing. In this embodiment, the front direction when viewed from the listening point is represented by an absolute angle, similarly to the viewpoint direction. In step S201, all the data of the listening point information are initialized.

More specifically, in step S202, it is determined whether the depression angle of the viewpoint information designated by the viewpoint information designation unit 6 in step S101 is smaller than −10°. The purpose of this processing is to determine whether the designated viewpoint information indicates a bird's-eye viewpoint or horizontal viewpoint. The bird's-eye viewpoint indicates a case in which the viewpoint is at a position where the capturing target such as the stadium is observed from a bird's eye view based on the information. The horizontal viewpoint indicates a case in which the viewpoint is at a position where the capturing target is observed horizontally from the side. Therefore, in this embodiment, a depression angle of −10° is set as the criterion to determine switching of the viewpoint. This is merely an example, and another determination criterion may be used in accordance with the implementation status. For example, if the capturing target is a basketball court in a gymnasium, a depression angle serving as a determination criterion may be set to a larger angle such as −20°. If an observation range is vertically large in terms of the properties of an observation target, a case in which a bird's-eye viewpoint is determined is appropriately set, thereby making it possible to appropriately decide the listening range and represent a realistic audio signal. Alternatively, the horizontal plane projection range of the angle of view calculated in step S203 as subsequent processing may be calculated in advance. Then, if the projection range falls within a predetermined range, the bird's-eye viewpoint may be determined; otherwise, the horizontal viewpoint may be determined. As described above, in this embodiment, it is determined whether the depression angle of the line of sight is smaller than a predetermined negative value. The processing of deciding the listening range is branched in accordance with the determination result, thereby making it possible to appropriately decide the listening range as the basis of audio signal generation.

If it is determined that the depression angle is smaller than −10°, that is, the bird's-eye viewpoint is determined (YES in step S202), the process advances to step S203; otherwise, that is, if the horizontal viewpoint is determined (NO in step S202), the process advances to step S205.

In step S203, a range obtained when the angle of view of the viewpoint information is projected on an event plane in the stadium as the capturing target or the like, that is, the horizontal plane is calculated, and set as a listening range. As an example, a case in which an arbitrary viewpoint image of a viewpoint having a viewpoint position (15, 0, 10), a viewpoint depression angle of −45°, a viewpoint direction of 0° (that is, the positive direction of the Y-axis), a horizontal angle of view of 20°, and a vertical angle of view of 14° is projected on an event plane with a height of 0 will be described. In this case, the horizontal plane coordinates of the central point of the projection plane (Z=0) are (15, 10), and the projection plane has a trapezoidal shape whose upper base has a Y-coordinate of "10×tan 52°≈12.8" and whose lower base has a Y-coordinate of "10×tan 38°≈7.8". Half the vertical angle of view of 14° is given by 14°/2=7°, and 52°=45°+7° and 38°=45°−7° are obtained.

The distances between the viewpoint and the central points of the upper and lower bases of the trapezoid are respectively given by 10/cos 52°≈16.2 and 10/cos 38°≈12.7. If the trapezoid is opened by 10° (half the horizontal angle of view of 20°) leftward and rightward, the length of the upper side of the trapezoid is given by 16.2×tan 10°×2≈5.7 and the length of the lower base of the trapezoid is given by 12.7×tan 10°×2≈4.5.

Thus, the listening range is a region surrounded by four points (12.15, 12.8), (17.85, 12.8), (12.75, 7.8), and (17.25, 7.8) on the projection plane of Z=0. In this case, the X-coordinates of the vertices of the upper side of the trapezoid on the projection plane are given by 15−5.7/2=12.15 and 15+5.7/2=17.85. The X-coordinates of the vertices of the lower base of the trapezoid on the projection plane are given by 15−4.5/2=12.75 and 15+4.5/2=17.25. The thus calculated listening range is stored in the listening information stored in the internal RAM of the listening range decision unit 2.

In step S204, in the listening range decided in step S203, a direction on the projection plane (horizontal plane) corresponding to the upper direction of the angle of view is set as a listening direction. In the above example, 0° (that is, the positive direction of the Y-axis) is set. After the processing ends, the process advances to step S208.

On the other hand, in step S205, the object position coordinates detected by the object position detection unit 9 in step S108 are acquired. In step S206, a range surrounding the acquired object position is calculated, and set as a listening range. For example, if the number of object positions acquired in step S205 is three, and their horizontal plane coordinates are (2, 2), (6, 3), and (5, 6), a range surrounded by four points (1, 1), (1, 7), (7, 1), and (7, 7) is set as a listening range surrounding the object positions. That is, in this example, when the minimum and maximum values of the X-coordinates of all the object positions are represented by Xmin and Xmax and the minimum and maximum values of the Y-coordinates of all the object positions are represented by Ymin and Ymax, the listening range is defined by a rectangle having (Xmin−1, Ymin−1), (Xmin−1, Ymax+1), (Xmax+1, Ymin−1), and (Xmax+1, Ymax+1) as vertex coordinates. The listening range need not be rectangular as long as the range has a minimum size to include all the acquired object positions.

In step S207, the viewpoint direction of the viewpoint information transmitted in step S101 is stored intact as the listening direction in the listening point information. With this processing, if the horizontal viewpoint is determined, the viewpoint direction in the arbitrary viewpoint image matches the direction of a sound in the reproduction signal. After the processing ends, the process advances to step S208.

Step S208 is processing of storing, as a listening point, the central point of the listening range decided in step S203 or S206 in the listening point information. That is, if the viewpoint depression angle is smaller than a predetermined angle, a position away from the position of the viewpoint in the line-of-sight direction serves as the position of the listening point. On the other hand, if the viewpoint depression angle is larger than the predetermined angle, the listening point is decided based on the position of the viewpoint and the position of the object captured by the plurality of cameras. In the example of this embodiment, since the listening range is rectangular, the intersection point of diagonal lines is calculated, and stored, as a listening point, in the listening point information in the internal RAM. Note that as the coordinates of the listening point, the average coordinates of the vertices of the rectangle defining the listening range may be set. In step S209, the listening point information stored in the internal RAM is output to the sound pickup point selection unit 3, and the process ends the listening range decision processing, and returns.

Figure 6A:
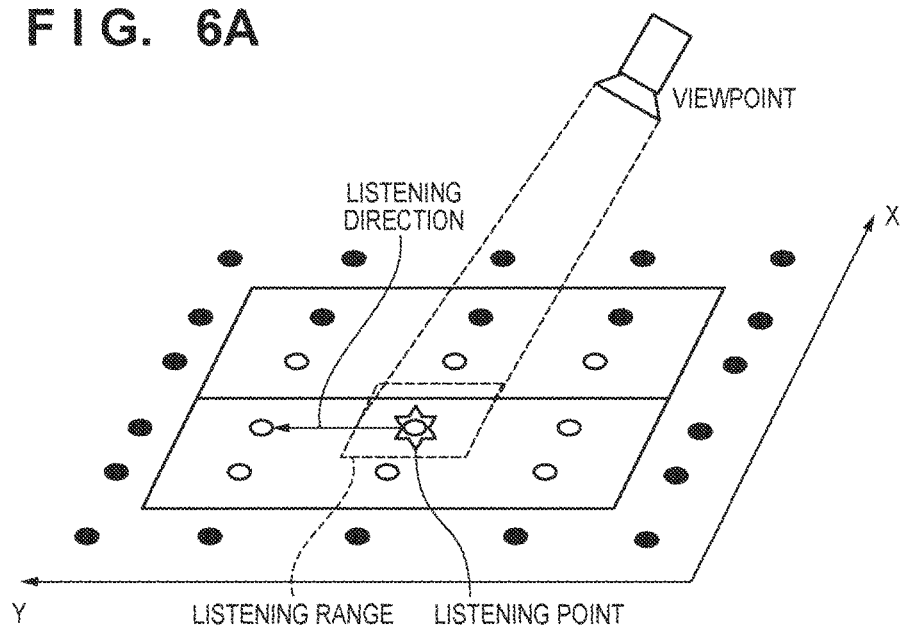
FIGS. 6A and 6B are schematic views each showing the relationship between a viewpoint and a listening range, listening point, and listening direction.
Figure 6B:
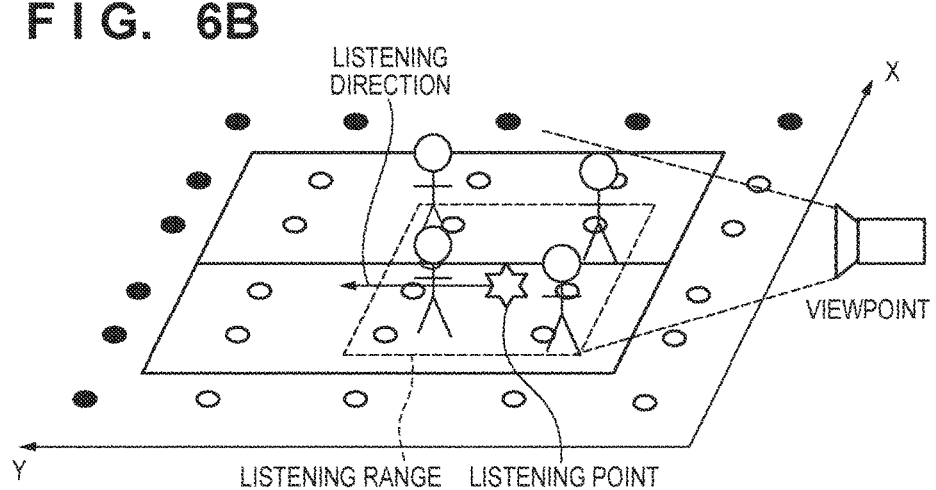

FIGS. 6A and 6B are schematic views each showing the relationship between the viewpoint and the listening range, listening point, and listening direction according to this embodiment. In FIGS. 6A and 6B, the listening range is represented by a dotted rectangle. The listening point is represented by an eight-pointed star and the listening direction is represented by a black arrow. FIG. 6A shows the case of the bird's-eye viewpoint, in which a range obtained by projecting the angle of view on the horizontal plane is set as a listening range, the intersection point of the diagonal lines of the range is set as a listening point, and the positive direction of the Y-axis corresponding to the upper direction of the angle of view is set as a listening direction. On the other hand, FIG. 6B shows the case of the horizontal viewpoint, in which the positions of the objects in the arbitrary viewpoint image are detected, and a listening range is set to surround the positions. The intersection point of the diagonal lines of the listening range is set as a listening point and the viewpoint direction (the positive direction of the Y-axis) is set as a listening direction.

As described above, the listening range decision processing of this embodiment automatically decides the listening range, listening point, and listening position corresponding to the arbitrary viewpoint image from the viewpoint information and the positions of the objects. That is, in accordance with the viewpoint position and line-of-sight direction, a listening point serving as a reference for generating an audio signal corresponding to the image generated by the viewpoint image generation unit 8 is decided, and an audio signal corresponding to the listening point is generated based on the plurality of sound pickup signals. In this way, the listening point, listening range, and listening direction are automatically decided in accordance with the viewpoint position, the line-of-sight direction, the angle of view, the positions of the objects, and the like, and audio at an arbitrary viewpoint is automatically generated, thereby making it possible to faithfully represents a change in audio in accordance with a change in viewpoint. Note that in this embodiment, the listening range and listening position are decided by the projection range of the angle of view and detection of the positions of the objects. However, the center of the arbitrary viewpoint image may simply be set as a listening point all the time. Furthermore, for example, almost the same position as the position of the viewpoint specified from the viewpoint information may be set as the position of a listening point.

In this embodiment, if the depression angle of the line of sight is smaller than the predetermined negative value, and the bird's-eye viewpoint is determined, a range in the capturing target corresponding to the angle of view when viewed from the viewpoint is decided as a listening range. If the depression angle of the line of sight is not smaller than the predetermined negative value, and the horizontal viewpoint is determined, a range surrounding the positions of the objects in the capturing target is decided as a listening range. As described above, when the listening range decision method is branched in accordance with the depression angle of the line of sight, it is possible to reproduce a realistic audio in accordance with the depression angle of the line of sight.

Furthermore, in this embodiment, a listening direction indicating the direction of listening at the listening point is decided based on the line-of-sight direction. In audio signal generation, an audio signal according to the listening direction is generated. More specifically, the upper direction of the angle of view is set as a listening direction for the bird's-eye viewpoint, and the viewpoint direction is decided as a listening direction for the horizontal viewpoint. Thus, it is possible to generate an audio signal corresponding to the line-of-sight direction. The embodiment can be implemented differently without departing from the scope of the present invention.

(Object Position Detection Processing)

FIG. 7 is a flowchart illustrating the detailed processing procedure of the object position detection processing in step S108 according to this embodiment. Note that the object position detection unit 9 executes all processes in this flowchart.

In step S301, all data primarily saved in the internal RAM of the object position detection unit are initialized. In step S302, the arbitrary viewpoint image generated by the viewpoint image generation unit 8 in step S107 is analyzed, and in-focus objects in the arbitrary viewpoint image are detected and all extracted. For example, objects having clear contours, that is, in-focus objects are detected by converting the arbitrary viewpoint image into a contrast image, an edge image, or the like. Each extracted object is not limited to a person such as a player, and may be, for example, a substance such as a car or motorbike. The number of objects may be one or more. In step S302, all the in-focus objects are extracted, and the feature of each extracted image is primarily stored in the internal RAM as object information.

In steps S303 to S306, loop processing is performed for each piece of object information extracted in step S302. In step S303, the loop processing starts. In step S304, among the plurality of camera images used to generate the arbitrary viewpoint image, a plurality of camera images obtained by capturing images including the processing target object are specified, and corresponding camera position coordinates and object directions are obtained. In step S305, based on the plurality of sets of camera position coordinates and the plurality of object directions obtained in step S304, the position coordinates of the processing target object are calculated by triangulation. The calculated coordinates are saved as object position coordinates in the internal RAM of the object position detection unit.

In step S306, it is determined whether the processing has ended for all the pieces of object information. If the processing has ended, the process exits from the loop to end the object position detection processing, and returns. Note that the object position coordinates stored in the internal RAM are appropriately output to the listening range decision unit 2 in response to a request from the listening range decision unit 2.

As described above, in this embodiment, the arbitrary viewpoint image generated by the viewpoint image generation unit 8 is analyzed, and the position of an object included in the image is detected. Therefore, it is possible to appropriately decide a listening range by detecting the position of the object without providing a dedicated sensor or the like for detecting the position of the object. Note that the position of an object may be detected using a position sensor or the like.

(Sound Pickup Point Selection Processing)

Figure 8:
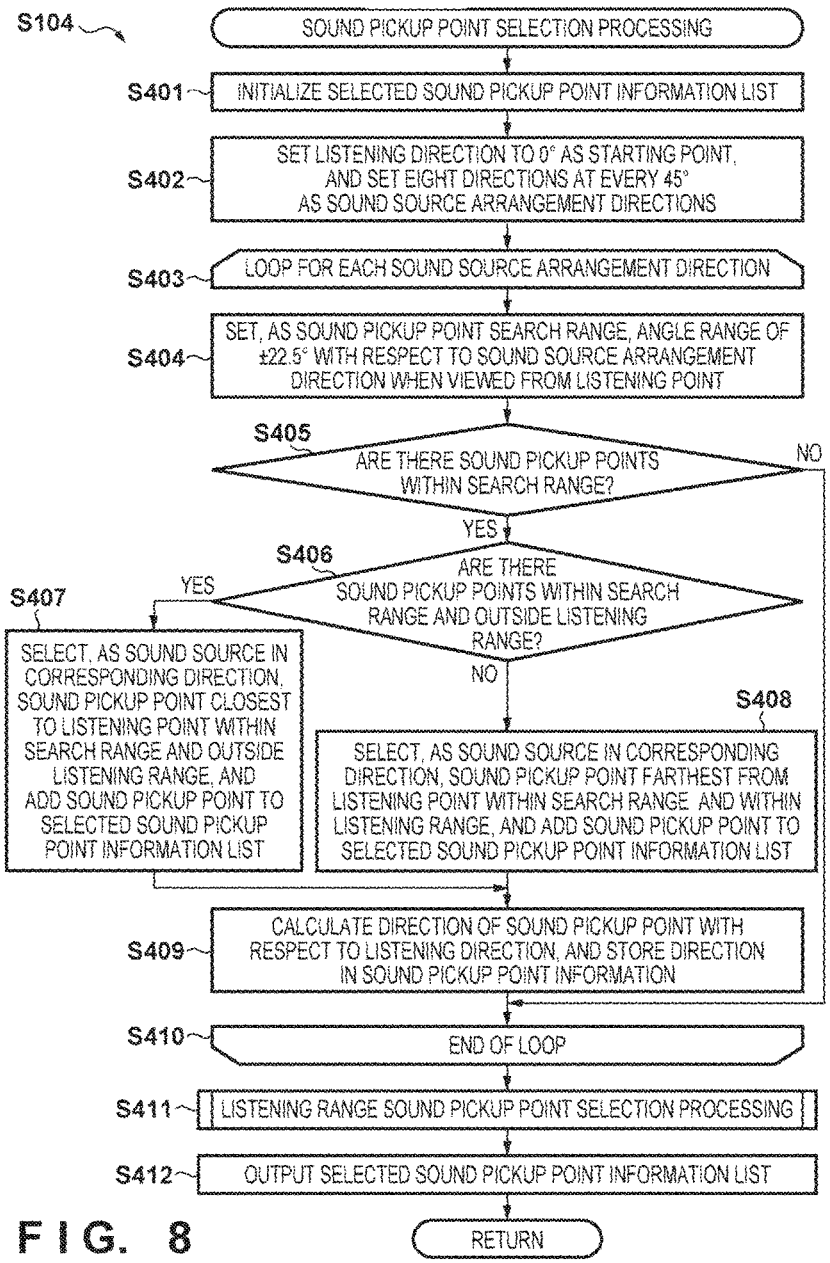
FIG. 8 is a flowchart illustrating the processing procedure of sound pickup point selection processing.

FIG. 8 is a flowchart illustrating the detailed processing procedure of the sound pickup point selection processing in step S104 according to this embodiment. Note that the sound pickup point selection unit 3 executes all processes in this flowchart.

In step S401, the selected sound pickup point information list saved in the internal RAM of the sound pickup point selection unit 3 is initialized. The selected sound pickup point information list is an area for storing information of each selected sound pickup point. FIG. 4E shows an example of the data structure of the selected sound pickup point information according to this embodiment. As shown in FIG. 4E, the selected sound pickup point information includes a sound pickup point ID, a corresponding sound source arrangement direction ID, and a direction when viewed from a listening point. Among them, the sound pickup point ID is an ID (identification information) for identifying a sound pickup point, and data common to the data having the same name stored in the sound pickup point information described with reference to FIG. 4B is used. The corresponding sound source arrangement direction ID is a number (identification information) indicating the sound source arrangement direction covered by the sound pickup point. Note that the sound source arrangement direction will be described later. The direction when viewed from the listening point is obtained by calculating, with reference to the listening direction, the direction of the sound pickup point when viewed from the listening point.

In step S402, the rough arrangement directions of the sound sources arranged around the listening point at the time of reproduction are decided based on the listening point information decided in step S103. In this embodiment, the listening direction is set to 0° as a starting point, and eight directions at every 45° on the horizontal plane are set as sound source arrangement directions.

In steps S403 to S410, loop processing is performed for each of the sound source arrangement directions set in step S402. In step S403, the loop processing starts.

In step S404, when viewed from the listening point, a region within an angle range of ±22.5° with respect to the target sound source arrangement direction is set as a sound pickup point search range. A sound pickup point corresponding to this sound source arrangement direction is searched for from the search range.

In step S405, it is determined whether there are sound pickup points within the search range set in step S404. If there are sound pickup points within the search range (YES in step S405), the process advances to step S406; otherwise (NO in step S405), it is decided not to assign any sound pickup point to the target sound source arrangement direction, and the process advances to step S410.

Step S406 is processing of determining whether there are sound pickup points within the angle range of the search range and outside the listening range. If it is determined that there are sound pickup points (YES in step S406), the process advances to step S407; otherwise (NO in step S406), the process advances to step S408.

Step S407 is processing of selecting, as a sound source in the sound source arrangement direction, a sound pickup point closer to the listening point within the search range and outside the listening range. After the sound pickup point is selected, a new element is added to the selected sound pickup point information saved in the internal RAM of the sound pickup point selection unit 3, and the sound pickup point ID of the selected sound pickup point and the corresponding sound source arrangement direction ID are stored. After the processing ends, the process advances to step S409.

On the other hand, in step S408, a sound pickup point farthest from the listening point within the search range and within the listening range is selected as a sound source in the sound source arrangement direction. In this case as well, an element storing the information of the selected sound pickup point is created and added to the selected sound pickup point information list. After the processing ends, the process advances to step S409.

Step S409 is processing of calculating the direction of the sound pickup point selected in step S407 or S408 when viewed from the listening direction, and storing the calculated direction in the selected sound pickup point information newly added in the preceding processing. If, for example, the coordinates of the listening point are (1, 1), the coordinates of the sound pickup point are (2, 1+√3), and the listening direction is 60°, the direction of the sound pickup point when viewed from the listening point is −30°, and this angle is stored in the selected sound pickup point information. After the processing ends, the process advances to step S410.

In step S410, it is determined whether the processing has ended for all the sound source arrangement directions. If the processing has ended for all the sound source arrangement directions, the loop ends. The process then advances to step S411.

Step S411 is processing of selecting sound pickup points to be used for reproduction from sound pickup points within the listening range, and deciding arrangement directions. Details of this processing (listening range sound pickup point selection processing) will be described later with reference to FIG. 9.

In step S412, the selected sound pickup point information list created by the above processes is output to the audio signal generation unit 4. Then, the process ends the sound pickup point selection processing, and returns.

As described above, in this embodiment, sound pickup points to be used to generate an audio signal are selected from the plurality of sound pickup points based on the listening range decided in accordance with the viewpoint position and line-of-sight direction, and an audio signal is generated using sound pickup signals picked up at the selected sound pickup points. By selecting sound pickup point necessary to generate a reproduction signal before the processing of generating a reproduction signal in step S105, it is possible to delete the processing necessary to generate a reproduction signal. Furthermore, by automatically selecting sound pickup points corresponding to a range of interest in the arbitrary viewpoint image, it is possible to generate a reproduction audio signal which corresponds to the arbitrary viewpoint image and improves the feeling of the user as if he/she existed in the image. Therefore, it is possible to generate a realistic audio corresponding to the arbitrary viewpoint image with a small processing amount.

In this embodiment, the capturing target when viewed from the listening point decided in accordance with the viewpoint position and line-of-sight direction is divided into a plurality of regions, and a sound pickup point is selected based on the listening range from each of the plurality of regions. That is, a plurality of sound pickup points located in different directions from the center of the listening range are selected. Therefore, it is possible to evenly select sound pickup points around the listening point with reference to the listening point.

If there are sound pickup points within the listening range in the region when viewed from the listening point, a sound pickup point farthest from the listening point is selected from the sound pickup points existing in the listening range. On the other hand, if there are no sound pickup points within the listening range in the region when viewed from the listening point, a sound pickup point closest to the listening point is selected from the sound pickup points existing in the region. It is thus possible to appropriately select sound pickup points corresponding to the spread of the listening range, and appropriately generate a reproduction signal.

Note that this embodiment has explained the example in which the eight directions are selected as the directions of sound sources arranged around the listening point for the reproduction audio signal. However, the number of the sound source directions is not limited to eight, and more or less directions may be selected. Furthermore, this embodiment has explained the example in which sound source arrangement directions are obtained by equally dividing a region around the listening point. Instead of this, for example, the region around the listening point may be divided in directions in accordance with the directions of channels in an audio reproduction environment, and the directions may be selected.

(Listening Range Sound Pickup Point Selection Processing)

Figure 9:
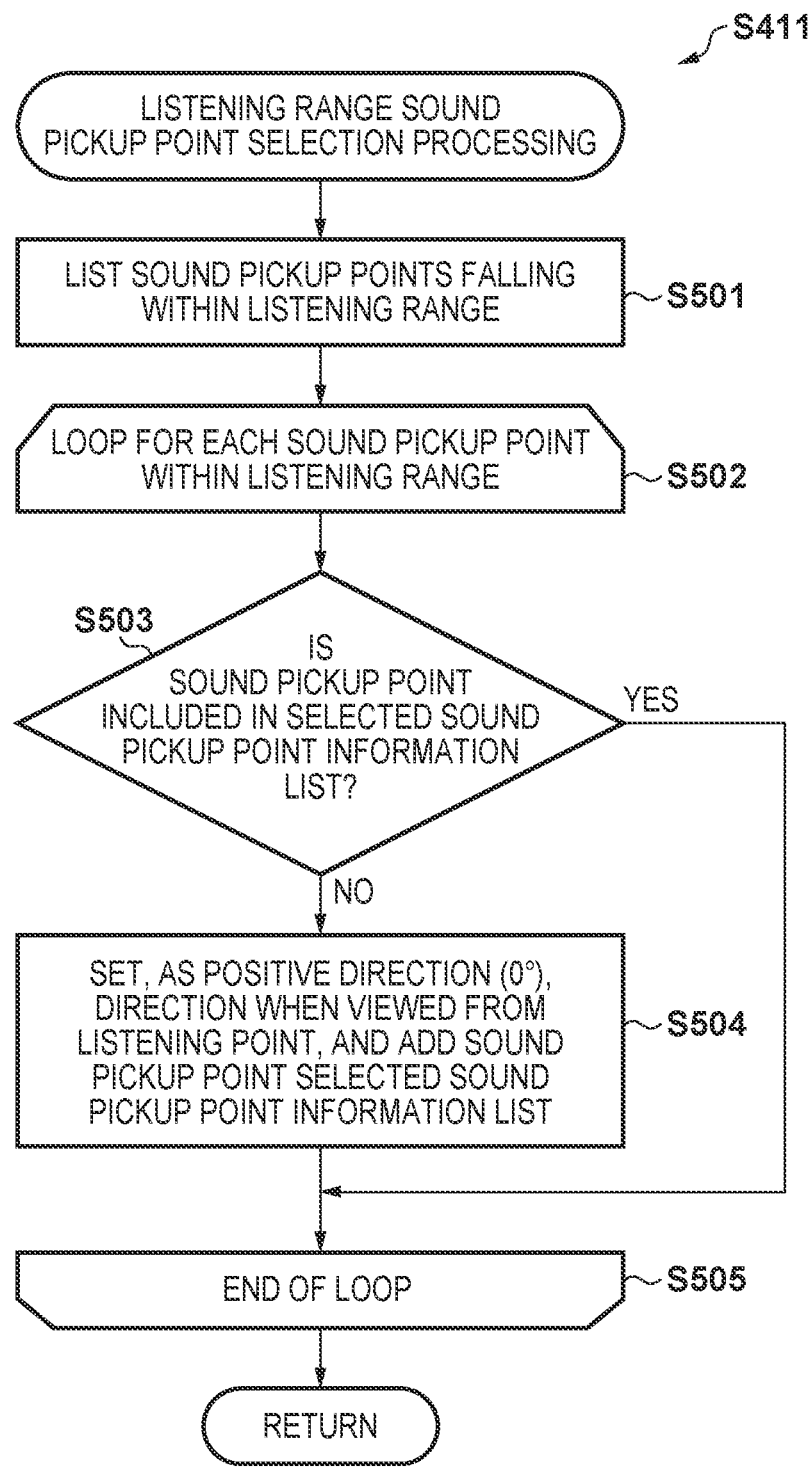
FIG. 9 is a flowchart illustrating the processing procedure of listening range sound pickup point selection processing.

FIG. 9 is a flowchart illustrating the detailed processing procedure of the listening range sound pickup point selection processing in step S411 according to this embodiment. Note that the sound pickup point selection unit 3 executes all processes in this flowchart.

In step S501, sound pickup points falling within the listening range are listed, and primarily saved in the internal RAM of the sound pickup point selection unit 3. In steps S502 to S505, loop processing is performed for each of the sound pickup points listed in step S501. In step S502, the loop processing starts.

In step S503, it is determined whether the processing target sound pickup point is included in the selected sound pickup point information list saved in the internal RAM. If the target sound pickup point is not included in the selected sound pickup point information list (NO in step S503), the process advances to step S504; otherwise (YES in step S503), the target sound pickup point has already been selected as a sound pickup point to be used for reproduction, and thus the process advances to step S505 to end the loop processing.

In step S504, a new element is added to the selected sound pickup point information list saved in the internal RAM, and the sound pickup point ID of the sound pickup point and 0° as a direction when viewed from the listening point are stored. Consequently, in this embodiment, in the subsequent reproduction signal generation processing, signals picked up at the sound pickup points within the listening range are reproduced to be localized in front of a listener. After the processing ends, the process advances to step S505.

In step S505, it is confirmed whether the processing has ended for all the sound pickup points listed in step S501. If the processing has ended for all the sound pickup points, the process exits from the loop processing to end the listening range sound pickup point selection processing, and returns.

As described above, in this embodiment, since all the sound pickup points existing within the listening range are selected to generate a reproduction signal, it is possible to generate a realistic audio in accordance with the listening range. In addition, since a sound pickup point closest to the listening point is selected in each of the plurality of regions when viewed from the listening point, it is possible to generate a realistic audio signal based on the positional relationship between the listening point and the sound pickup points.

(Reproduction Signal Generation Processing)

Figure 10:
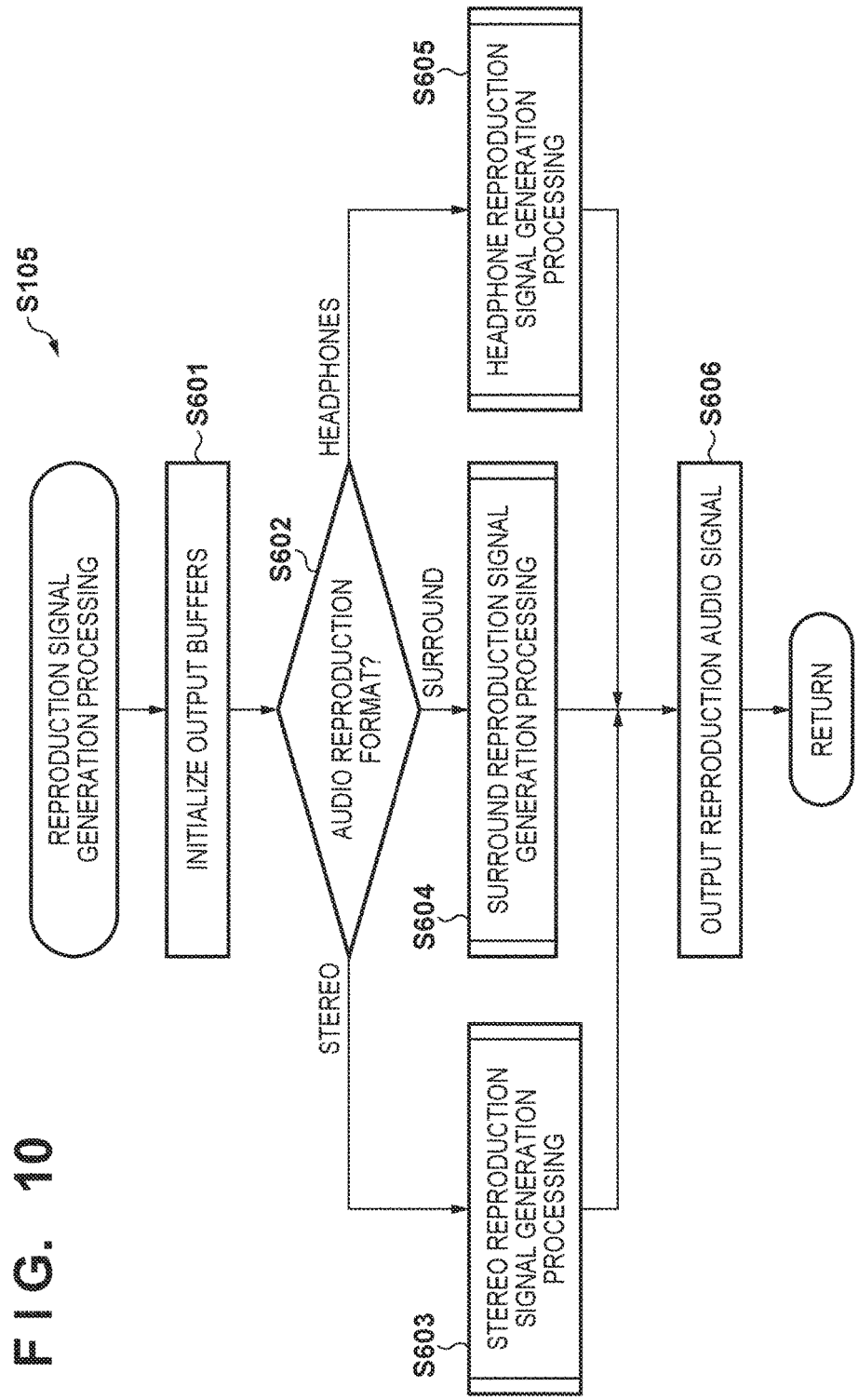
FIG. 10 is a flowchart illustrating the processing procedure of reproduction signal generation processing.

FIG. 10 is a flowchart illustrating the detailed processing procedure of the reproduction signal generation processing in step S105 according to this embodiment. In the reproduction signal generation processing, an audio signal corresponding to the listening point and listening range is generated based on a plurality of sound pickup signals. Note that the audio signal generation unit 4 executes all processes in this flowchart.

Step S601 is processing of initializing and clearing output buffers in the audio signal generation unit 4. The output buffers are provided for the respective output channels of reproduction audio signals, and accumulate generated audio signals for the respective output channels. After the processing ends, the process advances to step S602.

Step S602 is processing of determining an environment where an audio signal to be generated is reproduced. As described above, in the example of this embodiment, the stereo reproduction environment, the surround reproduction environment, and the headphone reproduction environment are provided as environments where an audio signal is reproduced, and an audio reproduction format is set in accordance with one of these environments.

If the stereo reproduction environment is determined, the process advances to step S603. If the surround reproduction environment is determined, the process advances to step S604. If the headphone reproduction environment is determined, the process advances to step S605.

Step S603 is processing of generating a stereo reproduction signal using the sound pickup signals of the sound pickup points selected in step S104. Details of this processing will be described later with reference to FIG. 11. After the processing ends, the process advances to step S606.

Step S604 is processing of generating a surround reproduction signal using the sound pickup signals of the sound pickup points selected in step S104. Details of this processing will be described later with reference to FIG. 12. After the processing ends, the process advances to step S606.

Step S605 is processing of generating a headphone reproduction signal using the sound pickup signals of the sound pickup points selected in step S104. Details of this processing will be described later with reference to FIG. 13. After the processing ends, the process advances to step S606.

Step S606 is processing of outputting the reproduction audio signal generated in the immediately preceding processing to the audio reproduction unit 11 and the MUX 15. After the processing ends, the process ends the reproduction signal generation processing, and returns. Note that the flowchart of FIG. 10 shows an example of selecting and generating one of the reproduction formats. These formats may be all generated successively.

As described above, in this embodiment, a listening direction indicating the direction of listening at the listening point is further decided based on the line-of-sight direction, and an audio signal to be heard from the front in the listening direction is generated using the sound pickup signals picked up at the sound pickup points selected in step S104. Therefore, it is possible to reproducibly represent audio corresponding to the arbitrary viewpoint image in consideration of the direction.

(Stereo Reproduction Signal Generation Processing)

Figure 11:
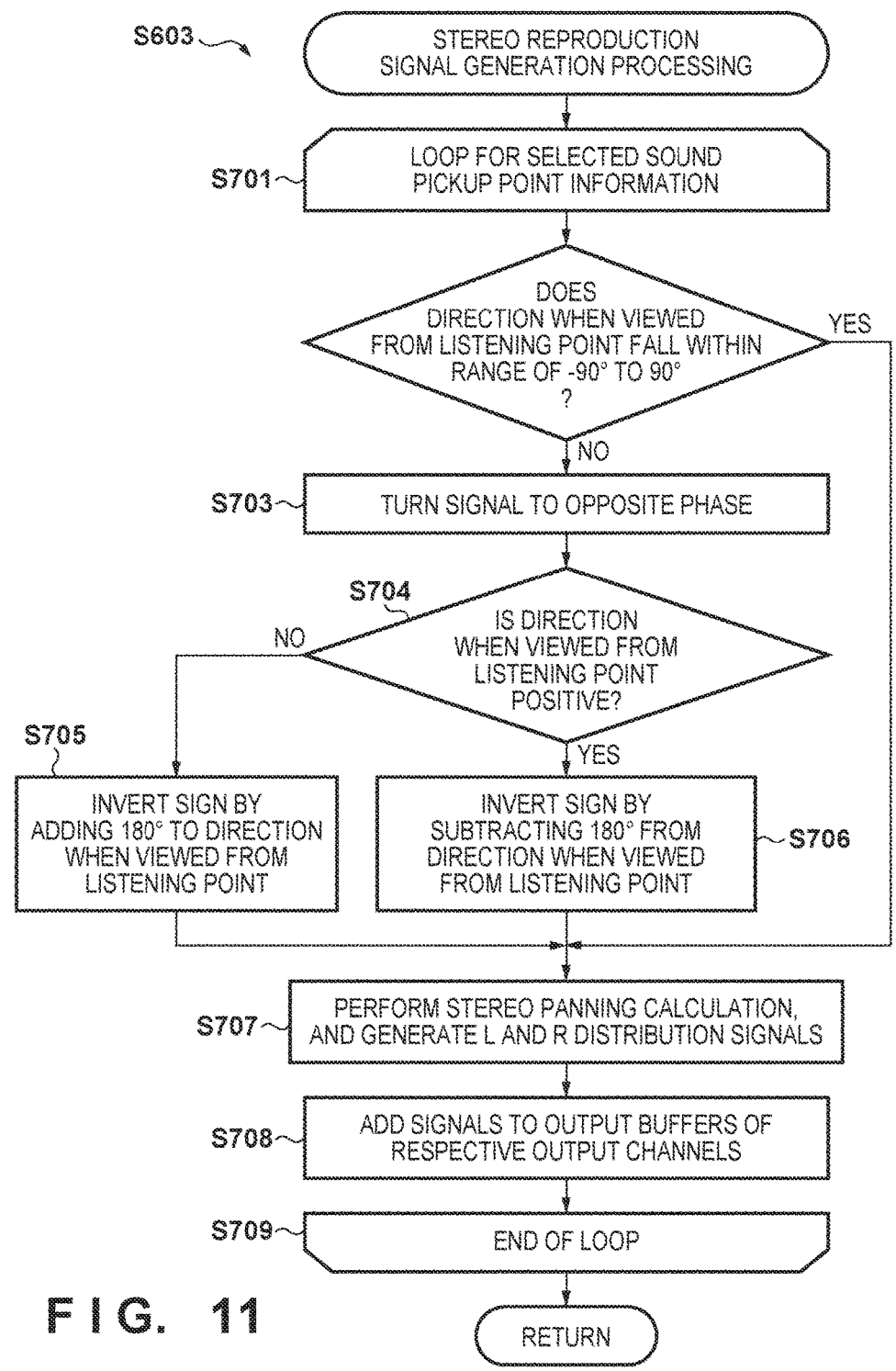
FIG. 11 is a flowchart illustrating the processing procedure of stereo reproduction signal generation processing.

FIG. 11 is a flowchart illustrating the detailed processing procedure of the stereo reproduction signal generation processing in step S603 according to this embodiment. Note that the audio signal generation unit 4 executes all processes in this flowchart.

In steps S701 to S709, loop processing is performed for each piece of selected sound pickup point information stored in the selected sound pickup point information list output from the sound pickup point selection unit 3 in step S104.

In step S701, the loop processing starts. In step S702, it is determined whether a direction when viewed from the listening point of the processing target selected sound pickup point information falls within the range of −90° to 90°, that is, the target sound pickup point is located in a region from the side to the front when viewed from the listening point. If, as a result of this processing, the direction falls outside the range, that is, the sound pickup point is located behind (NO in step S702), the process advances to step S703; otherwise, that is, the sound pickup point is located forward (YES in step S702), the process advances to step S707.

In step S703, a sound pickup signal stored in the target selected sound pickup point information is turned to an opposite phase. With this processing, the listener never feels a sound image behind but a sound from behind can be heard differently from the normal sound. In step S704, it is determined whether the direction of the sound pickup point when viewed from the listening point is positive. If the direction is not positive, that is, the sound pickup point exists on the left when viewed from the listening point (NO in step S704), the process advances to step S705. If the direction is positive, that is, the sound pickup point exists on the right when viewed from the listening point (YES in step S704), the process advances to step S706.

In step S705, the sign is inverted by adding 180° to the direction when viewed from the listening point. On the other hand, in step S706, the sign is inverted by subtracting 180° from the direction when viewed from the listening point. The processing in step S705 or S706 can fold the rear half of a circle having the listening point as its center forward, thereby converting the backward direction into the forward direction. After the processing ends, the process advances to step S707.

In step S707, stereo panning calculation is performed for the direction when viewed from the listening point falling within the range of −90° to 90°, the sound pickup signal is distributed to L and R channels in accordance with the obtained amplitude distribution ratios of the L and R channels. In general, right and left loudspeakers are arranged at ±30° in the standard stereo reproduction environment. Therefore, stereo panning calculation is performed by linearly projecting, on the range of ±30°, the direction when viewed from the listening point falling within the range of ±90°. In this embodiment, when θ represents the direction when viewed from the listening point, this panning calculation is performed using the sine rule, given by:

$$wL=(\sin 30°-\sin(\theta*30/90))/2 \sin 30°=\frac{1}{2}-\sin(\theta/3)$$

$$wR=(\sin 30°+\sin(\theta*30/90))/2 \sin 30°=\frac{1}{2}+\sin(\theta/3) \qquad (1)$$

where wL represents the amplitude distribution ratio of the left channel, and wR represents the amplitude distribution ratio of the right channel.

In step S708, the channel signals distributed in step S707 are added to the output buffers for the respective channels. In step S709, it is confirmed whether the processing has ended for all the pieces of selected sound pickup point information included in the selected sound pickup point information list. If the processing has ended for all the pieces of selected sound pickup point information, the process exits from the loop processing to end the stereo reproduction signal generation processing, and returns.

(Surround Reproduction Signal Generation Processing)

Figure 12:
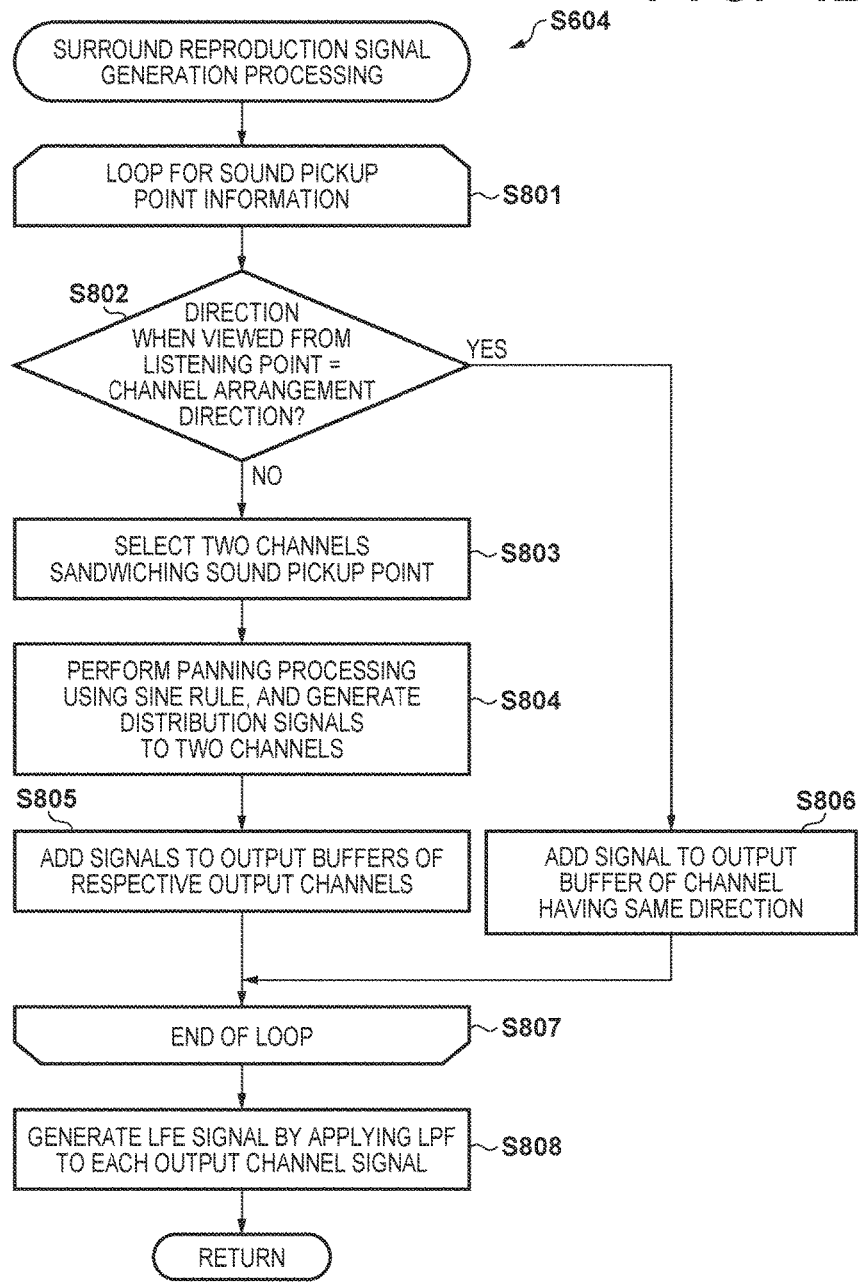
FIG. 12 is a flowchart illustrating the processing procedure of surround reproduction signal generation processing.

FIG. 12 is a flowchart illustrating the detailed processing procedure of the surround reproduction signal generation processing in step S604 according to this embodiment. Note that the audio signal generation unit 4 executes all processes in this flowchart.

In steps S801 to S807, loop processing is performed for each piece of selected sound pickup point information included in the selected sound pickup point information list.

In step S801, the loop processing starts. In step S802, it is determined whether the direction of the sound pickup point when viewed from the listening point is a predetermined channel arrangement direction. If, for example, the reproduction environment is a 5.1-channel surround reproduction environment, predetermined channel arrangement angles are 0°, ±30°, and ±110° to 130°. If the direction of the sound pickup point when viewed from the listening point, which is indicated by the target selected sound pickup point information, corresponds to an angle within the range, the direction of the sound pickup point is determined as the channel arrangement direction. In this case (YES in step S802), the process advances to step S806; otherwise (NO in step S802), the process advances to step S803.

Step S803 is processing of selecting two channels in directions sandwiching an angle in the direction of the sound pickup point when viewed from the listening point. If, for example, the direction of the sound pickup point when viewed from the listening point is 50°, an R channel of 30° and an SR channel of 120° are selected as channels sandwiching the direction of the sound pickup point.

In step S804, amplitude panning calculation is performed between the channels selected in step S803, and the sound pickup signal of the sound pickup point is distributed to the two channels. In this embodiment, amplitude panning calculation is performed using the sine rule. By exemplifying the above example, the central direction between the directions of the R and SR channels is 75°, and the opening angle between the central direction and the direction of each channel is 45°. When viewed from the central direction between the channels, 50° corresponds to 50°−75°=−25°. Using the sine rule, the distribution ratios wR and wS of the R and SR channels are obtained by:

$$wR=(\sin 45°-\sin(-25°))/2 \sin 45°\approx 0.649$$

$$wSR=(\sin 45°+\sin(-25°))/2 \sin 45°\approx 0.351 \qquad (2)$$

In step S805, the signals of the respective channels distributed in step S804 are added to the output buffers for the respective channels. On the other hand, in step S806, the sound pickup signal is added intact to the output buffer for the channel whose direction is the same as that determined in step S802.

In step S807, it is confirmed whether the processing has ended for all the pieces of selected sound pickup point information included in the selected sound pickup point information list. If the processing has ended for all the pieces of selected sound pickup point information, the process ends the loop processing, and advances to step S808.

In step S808, an LFE (Low Frequency Element) signal is generated by applying a low-pass filter (LPF) to each of the audio signals accumulated in the output buffers for the respective channels, and adding the obtained signals. The LFE signal is a low-frequency signal, and a signal of 80 Hz or less is generally extracted by the low-pass filter. This signal is reproduced by a subwoofer included in the surround speaker set. The generated LFE signal is accumulated in an output buffer for an LFE channel. After the processing ends, the process ends the surround reproduction signal generation processing, and returns.

(Headphone Reproduction Signal Generation Processing)

Figure 13:
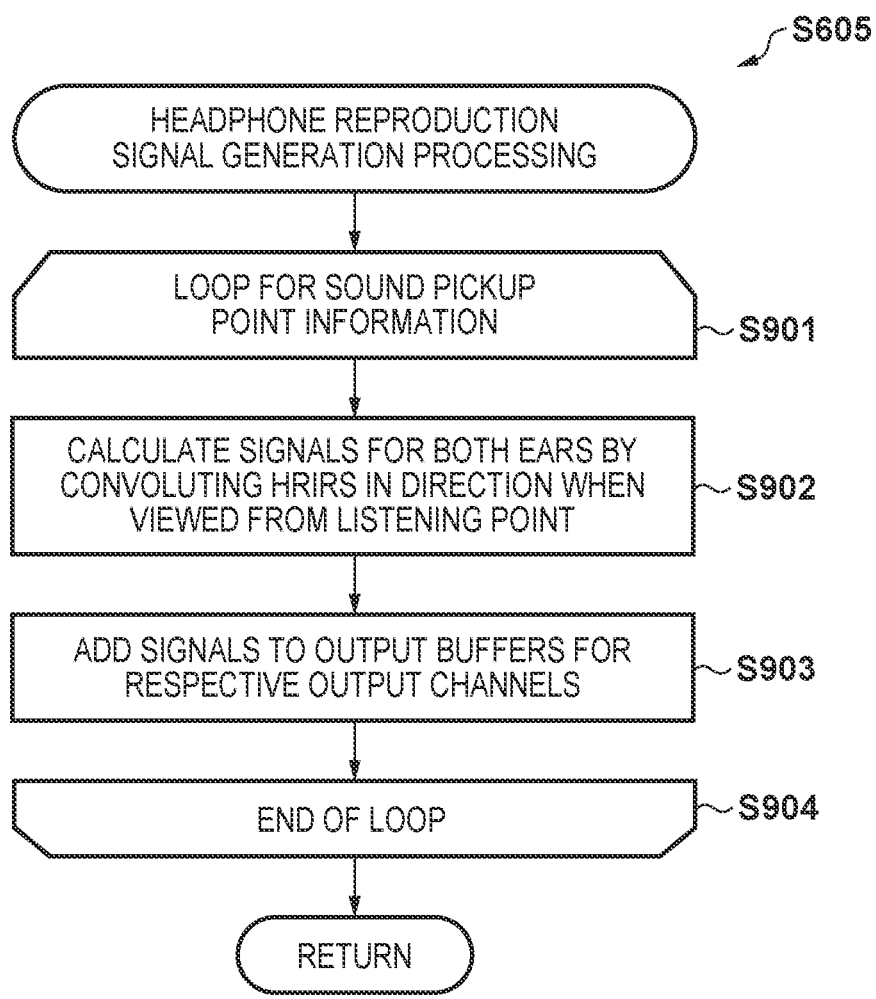
FIG. 13 is a flowchart illustrating the processing procedure of headphone reproduction signal generation processing.

FIG. 13 is a flowchart illustrating the detailed processing procedure of the headphone reproduction signal generation processing in step S605 according to this embodiment. Note that the audio signal generation unit 4 executes all processes in this flowchart.

In step S901 to S904, loop processing is performed for each piece of selected sound pickup point information included in the selected sound pickup point information list.

In step S901, the loop processing starts. In step S902, signals for both ears are calculated by convoluting, to the sound pickup signal, HRIRs in the direction when viewed from the listening point. HRIR is an abbreviation for "Head Related Impulse Response". The HRIRs are impulse responses for both ears obtained by measuring creeping of a sound, which is caused by the head and pinnae of a human and changes depending on the sound source direction. By convoluting the HRIRs to the sound pickup signal, it is possible to create a stereophonic audio signal in which the sound pickup signal is localized in the direction when viewed from the listening point if the sound is heard using the headphones. Note that in this embodiment, a database storing HRIRs for each direction is stored in the internal ROM of the audio signal generation unit 4. It is possible to read out and use HRIRs for both ears by inputting an arbitrary direction to perform a search.

In step S903, the signals for both ears generated in step S902 are added to the output buffers for the L and R output channels.

In step S904, it is confirmed whether the processing has ended for all the pieces of selected sound pickup point information included in the selected sound pickup point information list. If the processing has ended for all the pieces of selected sound pickup point information, the process exists from the loop to end the headphone reproduction signal generation processing, and returns.

Note that in this embodiment, reproduction signals are generated using the sound pickup signals of the sound pickup points in all the directions even in the stereo reproduction processing. However, for example, for stereo reproduction, only sound pickup signals of forward sound pickup points may be used to generate reproduction signals.

In this embodiment, the microphones for sound pickup are installed at the positions of the sound pickup points. A method of implementing sound pickup is not limited to this. For example, a sound at a sound pickup point aimed from far away may be picked up by picking up and processing a sound by aiming at a position corresponding to the sound pickup point using a plurality of microphones each capable of picking up a small sound from far away.

In this embodiment, sound pickup signals and captured image signals are immediately processed to generate and reproduce an arbitrary viewpoint image and an audio signal corresponding to it. However, the sound pickup signals and the captured image signals may be temporarily stored in a storage device, and processed later.

As described above, in the arrangement according to this embodiment, a listening range, listening point, and listening position according to an arbitrary viewpoint image are automatically decided from viewpoint information. Especially, a viewpoint and a listening point are decided so that the position of a viewpoint related to the arbitrary viewpoint image corresponds to the position of the listening point related to the audio signal. Then, in accordance with the decided viewpoint and listening point, an arbitrary viewpoint image and an audio signal are generated. This makes it possible to implement realistic sound field reproduction which changes in accordance with the movement of an arbitrary viewpoint.

Furthermore, it is possible to implement realistic sound field reproduction corresponding to an image while suppressing a processing amount by deciding a listening range corresponding to the arbitrary viewpoint image from the viewpoint information, selecting a minimum number of sound pickup points in accordance with the listening range, and appropriately arranging the sound pickup points in a reproduction sound field. That is, it is possible to automatically generate a realistic audio signal corresponding to the arbitrary viewpoint image by selecting, based on the listening range, sound pickup points to be used to generate an audio signal, and generating an audio signal.

Note that this embodiment has mainly explained a case in which a listening point is decided in accordance with a designated viewpoint. The present invention, however, is not limited to this. For example, a viewpoint may be decided in accordance with a designated listening point. Furthermore, for example, the arbitrary viewpoint image generation system may acquire information about a designated position on a three-dimensional space, and decide a viewpoint and a listening point based on the information.

In addition, this embodiment has explained a case in which whether to use sound pickup signals at respective sound pickup points to generate an audio signal is selected. However, weighting at the time of combining sound pickup signals to be used may be decided. In this case, a weight of 0 is set in a sound pickup signal not to be used.

Other Embodiments

In the first embodiment, a reproduction signal is generated using all the sound pickup signals at the sound pickup points within the listening range. However, it is possible to select and use important sound pickup signals among the sound pickup signals within the listening range. An example in which a sound pickup signal including a human voice (to be referred to as a "voice" hereinafter) is selected as an example of the important sound pickup signal will be described. An embodiment in this case will be described below.

This embodiment is different from the first embodiment in that the listening range sound pickup point selection processing in step S411 of FIG. 8. The remaining part is the same as in the first embodiment and a description thereof will be omitted. The difference from the first embodiment will be mainly, briefly described.

Figure 14:
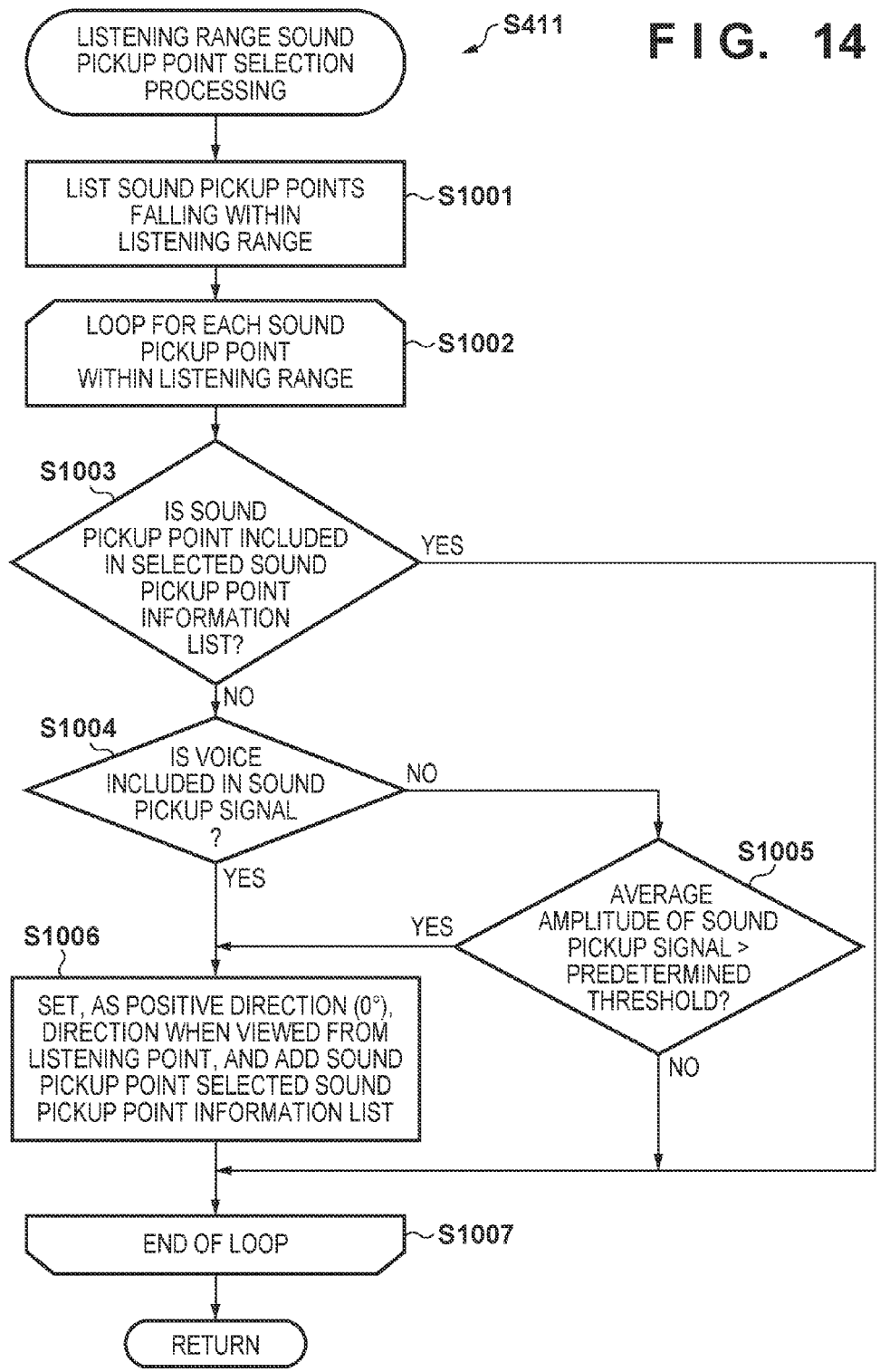
FIG. 14 is a flowchart illustrating the processing procedure of listening range sound pickup point selection processing.

FIG. 14 is a flowchart illustrating the detailed processing procedure of the listening range sound pickup point selection processing according to this embodiment. Processes in steps S1001 to S1003 are the same as those in steps S501 to S503 of FIG. 9 and a description thereof will be omitted.

Step S1004 is processing of analyzing the sound pickup signal of target sound pickup point information, and determining whether a sound (for example, a voice) having a predetermined feature in a frequency, an amplitude, or the like is included. Whether the sound pickup signal includes a voice is determined by performing pitch detection processing, formant detection processing and the like for the sound pickup signal. If it is determined that a voice is included, the process advances to step S1006; otherwise, the process advances to step S1005.

Step S1005 is processing of determining whether the average amplitude of the sound pickup signal exceeds a predetermined value (threshold). If it is determined that the threshold is exceeded, the process advances to step S1006; otherwise, the process advances to step S1007.

Processes in steps S1006 and S1007 are the same as in steps S504 and S505 of FIG. 9 and a description thereof will be omitted.

By performing the above-described processing control, it is possible to perform reproduction by selecting, among signals picked up at sound pickup points within a listening range, only signals each including a voice estimated to include important information or signals each of which can be estimated to be close to the sound source and has a large average amplitude. Consequently, it is possible to perform reproduction by selecting only important sounds while further reducing the processing amount of reproduction signal generation processing.

In the above arrangement, the example in which when selecting a sound pickup point within the listening range, a sound pickup point which is acoustically important such as a human voice is detected has been explained. Furthermore, a place where a predetermined event such as an event of kicking a ball or an event of forming a scrum occurs may be specified by analyzing an arbitrary viewpoint image, and a sound pickup point closest to the place may be selected. The occurrence of an event can be detected by designation of a user, the use of a sensor, or the like.

In the first embodiment, a sound in the upper direction on the screen is arranged forward for the bird's-eye viewpoint. However, if a signal is output to a reproduction format in which a channel is arranged in an upper layer in addition to the horizontal plane, a sound may be arranged in the upper channel. In this way, based on the positional relationship between the sound pickup points selected in step S104 when viewed from the viewpoint, sound pickup signals picked up at the sound pickup points are combined to generate an audio signal, thereby making it possible to reproduce a realistic audio in accordance with the arrangement of the sound pickup points. This embodiment can be implemented differently without departing from the scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-148995, filed Jul. 28, 2016, and Japanese Patent Application No. 2016-148996, filed Jul. 28, 2016 which are hereby incorporated by reference herein in their entirety.

What is claimed is:

1. An information processing apparatus comprising:
at least one processor; and
a memory which stores instructions executable by the at least one processor to cause the information processing apparatus to perform:
  acquiring information related to a position of a virtual viewpoint for a virtual viewpoint image generated based on images obtained by capturing a region from a plurality of directions by a plurality of cameras;
  determining, based on a position of an object in the region and the acquired information related to the position of the virtual viewpoint for the virtual viewpoint image, a virtual listening point for generating an audio signal; and
  generating, based on the determined virtual listening point and a plurality of collected sound signals obtained by a plurality of microphones for collecting at least a sound in a part of the region, the audio signal corresponding to the determined virtual listening point.

2. The apparatus according to claim 1, wherein the acquired information indicates the position of the virtual viewpoint and a line-of-sight direction of the virtual viewpoint.

3. The apparatus according to claim 1, wherein a position of the virtual listening point is determined based on the acquired information.

4. The apparatus according to claim 3, wherein a listening direction of the virtual listening point is determined based on the acquired information.

5. The apparatus according to claim 1, wherein a position of the determined virtual listening point is different from the position of the virtual viewpoint specified from the acquired information.

6. The apparatus according to claim 1, wherein a position of the determined virtual listening point is a position away, in a line-of-sight direction of the virtual viewpoint, from the position of the virtual viewpoint specified from the acquired information.

7. The apparatus according to claim 1, wherein a position in a predetermined positional relationship with an object included in a field of view according to the virtual viewpoint specified from the acquired information is determined as a position of the virtual listening point.

8. The apparatus according to claim 1, wherein the instructions further cause the information processing apparatus to perform:
  selecting, based on the acquired information related to the position of the virtual viewpoint for the virtual viewpoint image, at least one sound signal to be used for generating the audio signal from the plurality of sound signals, and
  generating the audio signal corresponding to the determined virtual listening point based on the selected at least one sound signal.

9. The apparatus according to claim 8, wherein the selected at least one sound signal corresponds to at least one sound pickup point selected from a plurality of sound pickup points.

10. The apparatus according to claim 9, wherein sound pickup points included in a range corresponding to a field of view of the virtual viewpoint specified from the acquired information are selected as the at least one sound pickup point.

11. The apparatus according to claim 9, wherein sound pickup points included in a range according to a position of an object captured by the plurality of cameras are selected as the at least one sound pickup point.

12. The apparatus according to claim 9, wherein sound pickup points at which a sound having a predetermined feature in a frequency and/or an amplitude is picked up are selected as the at least one sound pickup point among sound pickup points included in a range decided based on the acquired information.

13. The apparatus according to claim 9, wherein a sound pickup point included in a range decided based on the acquired information and a plurality of sound pickup points which are not included in the range and are located in different directions from a center of the range are selected as the at least one sound pickup point.

14. The apparatus according to claim 1, wherein in the determining, a position in a region defined based on positions of a plurality of objects included in a field of view according to the virtual viewpoint specified from the information acquired in the acquiring is determined as a position of the virtual listening point.

15. An information processing system comprising:
at least one hardware processor; and
a memory which stores instructions executable by the at least one hardware processor to cause the information processing apparatus to perform at least:
  acquiring information related to a position of a virtual viewpoint for a virtual viewpoint image generated based on images obtained by capturing a region from a plurality of directions by a plurality of cameras;
  determining, as a position of a virtual listening point for generating an audio signal, a position determined based on the acquired information related to the position of the virtual viewpoint for the virtual viewpoint image, wherein the position of the virtual listening point is different from the position of the virtual viewpoint; and
  generating, based on the determined position of the virtual listening point and a plurality of sound signals obtained by a plurality of microphones for picking up at least a sound in a part of the region, the audio signal corresponding to the virtual listening point.

16. The system according to claim 15, wherein a position related to ground in the region included in a field of view according to the virtual view point specified by the acquired information is determined as the position of the virtual listening point.

17. The system according to claim 15,
wherein a position included in a field of view according to the virtual viewpoint specified by the acquired information is determined as the position of the virtual listening point, and
wherein a height of the position of the virtual viewpoint is decided based on a height of ground in the region.

18. An information processing method comprising:
acquiring information related to a position of a virtual viewpoint for a virtual viewpoint image generated based on images obtained by capturing a region from a plurality of directions by a plurality of cameras;
determining, based on a position of an object in the region and the acquired information related to the position of the virtual viewpoint for the virtual viewpoint image, a virtual listening point for generating an audio signal; and
generating, based on the determined virtual listening point and a plurality of collected sound signals obtained by a plurality of microphones for collecting at least a sound in a part of the region, the audio signal corresponding to the virtual listening point.

19. An information processing method comprising:
acquiring information related to a position of a virtual viewpoint for a virtual viewpoint image generated based on images obtained by capturing a region from a plurality of directions by a plurality of cameras;
determining, as a position of a virtual listening point for generating an audio signal, a position determined based on the acquired information related to the position of the virtual viewpoint for a virtual viewpoint image, wherein the position of the virtual listening point is different from a position of the virtual viewpoint; and
generating, based on the determined position of the virtual listening point and a plurality of sound signals obtained by a plurality of microphones for picking up at least a sound in a part of the region, the audio signal corresponding to a virtual listening point.

20. A non-transitory computer-readable medium storing a program for causing a computer to execute a method, the method comprising:
acquiring information related to a position of a virtual viewpoint for a virtual viewpoint image generated based on images obtained by capturing a region from a plurality of directions by a plurality of cameras;
determining, based on a position of an object in the region and the acquired information related to the position of the virtual viewpoint for the virtual viewpoint image, a virtual listening point for generating an audio signal; and
generating, based on the determined virtual listening point and a plurality of collected sound signals obtained by a plurality of microphones for collecting at least a sound in a part of the region, the audio signal corresponding to the virtual listening point.

* * * * *